US009522371B2

(12) United States Patent
Marsh et al.

(10) Patent No.: US 9,522,371 B2
(45) Date of Patent: Dec. 20, 2016

(54) SELF-REGULATING GAS GENERATOR AND METHOD

(75) Inventors: Stephen A. Marsh, Carlisle, MA (US); Donald M. Parker, Marblehead, MA (US); Peter N. Pintauro, Brentwood, TN (US)

(73) Assignee: Encite LLC, Burlington, MA (US)

( * ) Notice: Subject to any disclaimer, the term of this patent is extended or adjusted under 35 U.S.C. 154(b) by 361 days.

(21) Appl. No.: 13/465,798

(22) Filed: May 7, 2012

(65) Prior Publication Data
US 2013/0295002 A1    Nov. 7, 2013

(51) Int. Cl.
| B01J 7/00 | (2006.01) |
| C01B 3/36 | (2006.01) |
| C01B 3/06 | (2006.01) |
| C01B 13/02 | (2006.01) |

(52) U.S. Cl.
CPC ............... *B01J 7/00* (2013.01); *C01B 3/065* (2013.01); *C01B 13/02* (2013.01); *Y02E 60/362* (2013.01)

(58) Field of Classification Search
CPC ........... C01B 3/065; B01J 7/02; Y02E 60/362; F17C 11/005
See application file for complete search history.

(56) References Cited

U.S. PATENT DOCUMENTS

| 3,159,506 A | * | 12/1964 | Saiathe | 429/416 |
| 3,554,707 A | | 1/1971 | Holmes et al. | |
| 4,404,170 A | | 9/1983 | Caudy et al. | |
| 6,312,846 B1 | | 11/2001 | Marsh | |
| 6,544,400 B2 | | 4/2003 | Hockaday et al. | |
| 6,683,025 B2 | | 1/2004 | Amendola et al. | |

(Continued)

FOREIGN PATENT DOCUMENTS

| DE | 10050554 A1 | 4/2002 |
| JP | 2001-294405 | 10/2001 |

(Continued)

OTHER PUBLICATIONS

International Search Report and Written Opinion in International Application No. PCT/US2013/039521, "Self-Regulating Gas Generator and Method," mailed Jul. 26, 2013.

(Continued)

*Primary Examiner* — Imran Akram
(74) *Attorney, Agent, or Firm* — Hamilton, Brook, Smith & Reynolds, P.C.

(57) ABSTRACT

A self-regulating gas generator that, in response to gas demand, supplies and automatically adjusts the amount of gas (e.g., hydrogen or oxygen) catalytically generated in a chemical supply chamber from an appropriate chemical supply, such as a chemical solution, gas dissolved in liquid, or mixture. In some embodiments, the gas generator may employ a piston, rotating rod, or other element(s) to expose the chemical supply to the catalyst in controlled amounts. In another embodiment, the self-regulating gas generator uses bang-bang control, with the element(s) exposing a catalyst, contained within the chemical supply chamber, to the chemical supply in ON and OFF states according to a self-adjusting duty cycle, thereby generating and outputting the gas in an orientation-independent manner. The gas generator may be used to provide gas for various gas consuming devices, such as a fuel cell, torch, or oxygen respiratory devices.

33 Claims, 16 Drawing Sheets

(56) References Cited

U.S. PATENT DOCUMENTS

| | | | |
|---|---|---|---|
| 6,939,529 B2 | 9/2005 | Strizki et al. | |
| 7,316,719 B2 | 1/2008 | Devos | |
| 7,655,056 B2 | 2/2010 | Devos | |
| 8,172,912 B2* | 5/2012 | Marsh et al. | 48/61 |
| 2001/0014477 A1 | 8/2001 | Pelc et al. | |
| 2001/0045364 A1 | 11/2001 | Hockaday et al. | |
| 2002/0083643 A1 | 7/2002 | Amendola et al. | |
| 2002/0100518 A1 | 8/2002 | Kuriiwa et al. | |
| 2004/0120889 A1 | 6/2004 | Shah et al. | |
| 2005/0158595 A1 | 7/2005 | Marsh et al. | |
| 2006/0147776 A1* | 7/2006 | Sarata | C01B 3/065 429/416 |
| 2006/0185242 A1 | 8/2006 | Cha | |
| 2006/0191199 A1* | 8/2006 | Rosenzweig | B01J 4/02 48/61 |
| 2008/0070071 A1* | 3/2008 | Devos | B01J 7/02 429/421 |
| 2011/0212374 A1* | 9/2011 | Rosenzweig | C01B 3/065 429/421 |
| 2011/0314805 A1* | 12/2011 | Seale | F01K 17/06 60/522 |
| 2012/0280179 A1 | 11/2012 | Marsh et al. | |

FOREIGN PATENT DOCUMENTS

| | | |
|---|---|---|
| JP | 2003-290645 | 10/2003 |
| WO | WO 01/74710 A1 | 10/2001 |
| WO | WO 02/08118 A1 | 1/2002 |
| WO | WO 02/30810 A1 | 4/2002 |
| WO | WO 2004/085307 A1 | 10/2004 |
| WO | WO 2005/049485 A1 | 6/2005 |
| WO | WO 2007/109036 A2 | 9/2007 |

OTHER PUBLICATIONS

Derwent WPI, WPI Acc. No. 2002-463254/200249, "Hydrogen Source Used for Operating Fuel Cell Comprises a Chemical Hydride Bound in an Organic Substance Which Reacts with Water Forming Gaseous Hydrogen" (2006).

International Search Report from International Application No. PCT/US2004/038565, "A Self-Regulating Gas Generator and Method," mailed Apr. 12, 2005.

International Preliminary Report on Patentability from International Application No. PCT/US2004/038565, "A Self-Regulating Gas Generator and Method," dated May 15, 2006.

Office Action from U.S. Appl. No. 13/464,881, mailed Jul. 23, 2014.

International Preliminary Report on Patentability from International Application No. PCT/US2013/039521, "Self-Regulating Gas Generator and Method," mailed Nov. 13, 2014.

Final Office Action in U.S. Appl. No. 13/464,881 "Self-Regulating Gas Generator and Method."

* cited by examiner

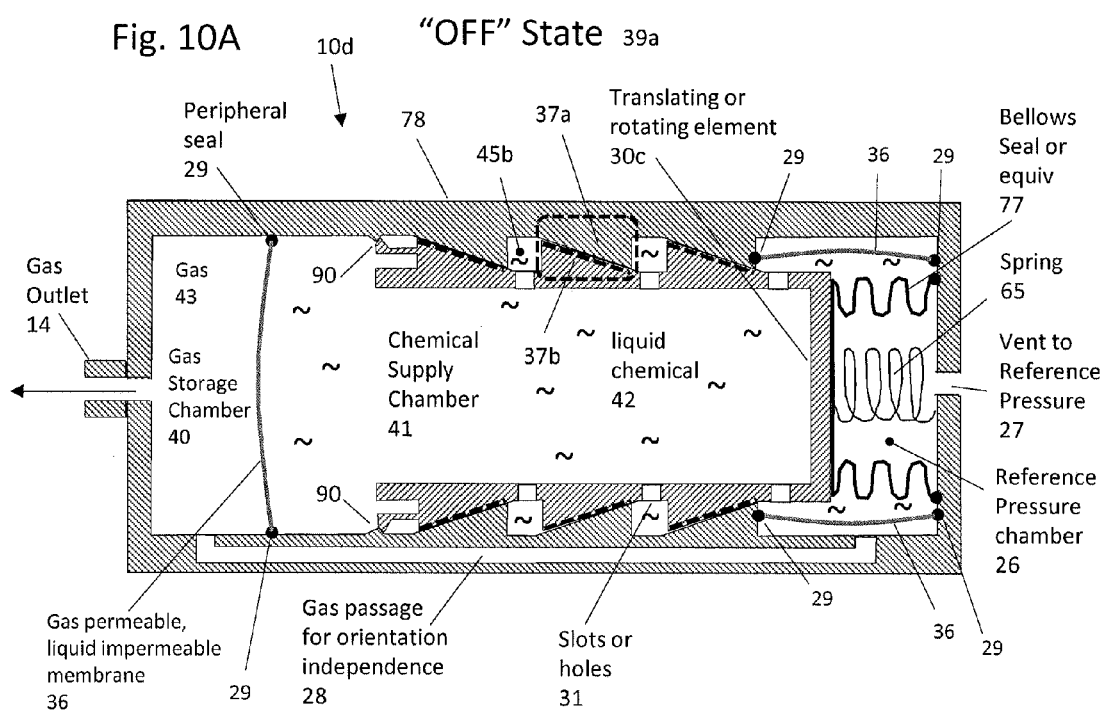
Fig. 10A "OFF" State
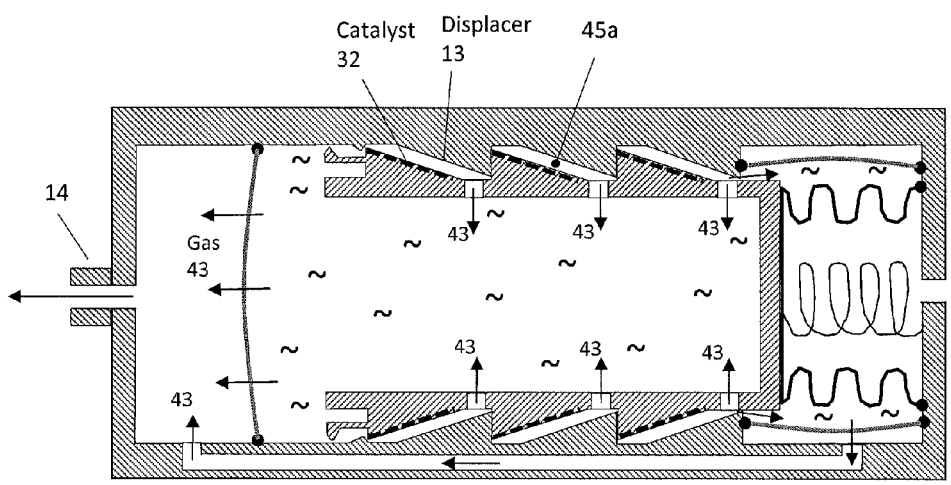
Fig. 10B "ON" State

Fig. 10C          "OFF" State
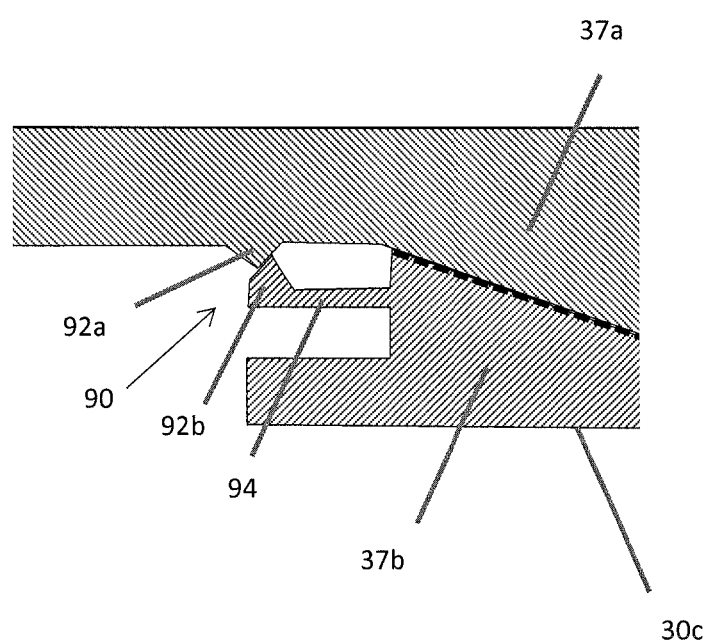

ON=Gas generation
OFF=No gas generation

Duty cycle = 10%

$\tau_{ON}$ and $\tau_{total}$ vary with fuel concentration and catalyst effectiveness $\tau_{OFF}$ is constant for a given gas demand Duty cycle = 50%

Duty cycle = 90%

SELF-REGULATING GAS GENERATOR AND METHOD

BACKGROUND OF THE INVENTION

Presently, nearly all military, industrial, and consumer electronics are powered by conventional sources—AC wall outlets, gas generators, or disposable or rechargeable batteries. Each of these power sources has its own drawbacks. One such drawback is in the form of pollution, where AC power generation plants, gas generators, and batteries produce respective environmentally unfriendly by-products (e.g., ozone destroying gases and battery acid waste).

Fuel cells have been proposed as an environmentally friendly solution to this problem. To be adopted as a solution, however, fuel (e.g., hydrogen gas) must be easily and safely accessible at a price competitive with its conventional counterparts.

Portable gas generators can safely produce high purity gas on demand. Such generators are useful in providing hydrogen gas as a fuel for fuel cells or other types of gases for other gas utilizing devices. In the case of generating hydrogen gas for fuel cells, which are expected to be used for many different military, industrial, and consumer applications, portable gas generators that are accepted in these markets will likely be lightweight, mechanically simple, demand responsive (i.e., produce gas only when the device using the fuel requires power), capable of operating in any orientation, and designed to store only small amounts of gas from the time the gas is generated until the time it is supplied to the device, thereby minimizing safety concerns of storing gases that are flammable or otherwise potentially dangerous.

SUMMARY OF THE INVENTION

A self-regulating, portable, gas generator, or method of gas generation corresponding thereto, according to the principles of the present invention generates gas for diverse portable power generation applications in a manner that automatically increases or decreases gas production rates in response to usage requirements. The self-regulating gas generator provides portability and has safety characteristics suitable for military, industrial, and consumer applications. Some embodiments of the self-regulating gas generator exhibit long lifespan of catalyst used to generate gas from a chemical supply based on the self-regulating features.

In one embodiment according to the principles of the present invention, a gas generator comprises a chamber for a chemical supply, such as a $NaBH_4$ solution. At least one element, closed to passage of the chemical supply, contains or is coated with a catalyst, such as platinum. In one embodiment, the element(s) move relative to the chemical supply chamber to position the catalyst relative to the chemical supply. In the presence of the catalyst, the chemical supply decomposes into products, including a generated gas, such as hydrogen gas, in the chemical supply chamber. The gas generator also includes a gas storage chamber, which stores the generated gas until use by a fuel cell to convert into electrical energy or by another gas consuming device to use for its intended purpose. The generated gas travels through a gas permeable structure (e.g., membrane) on a path from the chemical supply chamber to the gas storage chamber. The gas permeable structure may be located on, in, or apart from the element(s) where the catalyst is located. The position of the element(s) and, hence, the catalyst relative to the chemical supply, may be regulated by a feedback system utilizing a force generated in part by pressure in at least one of the chambers to position the catalyst in the presence of the chemical supply to regulate rate of generation of the generated gas.

The element(s) may take many forms and position the catalyst relative to the chemical supply in various ways. For example, the element(s) may translate relative to the chemical supply chamber, rotate relative to the chemical supply chamber, or remain in a fixed position relative to a body that includes the chemical supply chamber. Motion of the element(s) may alter the amount of catalyst exposed to the chemical supply. The element(s) may be ceramic or optionally made of thermally-conductive material(s). In some embodiments, the element(s) may be pistons, in which case they may be a hollow piston or a solid piston. In the case of a hollow piston, the element(s) may have one internal channel or may have internal structure that defines multiple channels adapted to allow the generated gas to flow through the piston on a path from the chemical supply chamber to the gas storage chamber.

In some embodiments, the element(s) are solid pistons that move relative to the chemical supply to a position that creates an equilibrium of forces acting upon the element(s), where the forces include forces due to a spring operatively connected to the element(s). In the solid piston embodiment, the chemical supply chamber may have a boundary or portion thereof that is a gas permeable structure. In some cases, the gas permeable structure may be a gas permeable membrane through which the generated gas passes across substantially the entire gas permeable membrane; and, in other embodiments, the gas permeable structure includes portions of gas permeable membrane and portions of non-gas permeable membrane. In some hollow piston embodiments, the element(s) may be coated with a gas permeable catalyst layer and the gas permeable structure.

The gas generator may include at least one adjustable spring connected to the elements. The spring(s) allow the relationship between pressure in the gas storage chamber and the position of the element(s) to be adjusted.

The element(s) may be coated with the gas permeable structure, covered with the gas permeable structure, or integrated into the gas permeable structure. The element(s) may also include a non-catalytic portion, which may be located along the length of the element(s). In the case of the element(s) being operated as a piston, the non-catalytic portion may be located at an end of the piston. The element(s) may be adapted to position the catalytic and non-catalytic portions with respect to the chemical supply so no catalyst is exposed to the chemical supply. Such a position discontinues decomposition of the chemical supply. The gas generator may also include a "wipe" that is adapted to dislodge products from the element(s) so as not to accumulate the products or other materials on the element(s), thereby increasing the lifespan of the catalyst or the element(s) themselves.

The gas permeable structure may include various aspects or perform various functions. For example, the gas permeable structure may separate a gas, such as hydrogen gas ($H_2$) from the chemical supply. The gas permeable structure may include palladium (Pd) or polymer structure. The gas permeable structure may be mechanically connected to the element(s).

The catalyst may be implemented in various forms. For example, the catalyst may include at least one of the following catalysts: a metal, metal boride, or polymer. The catalyst may be attached to the gas permeable structure, coated upon the gas permeable structure, attached to a non-permeable portion of the element(s), or coated on a non-permeable portion of the element(s).

The gas generator may also include other features. For example, the gas generator may include a capacity indicator that activates if the gas storage chamber reaches a predetermined pressure, such as substantially maximum gas capacity or it may provide an indication that the chemical supply is substantially exhausted. The gas generator may also include at least one pressure relief valve that reduces pressure of the gas storage chamber or chemical storage chamber if pressure in the respective chamber exceeds a predetermined threshold. The gas generator may also include a filter through which the generated gas passes before output for use by an external device. In another embodiment, the gas generator may include a humidifier through which the generated gas passes before output for use by an external device. The gas generator may also include a transducer for detecting a position of the element(s) relative to a known position of the chemical supply chamber.

The feedback system may regulate a rate at which the generated gas is generated. The feedback system may utilize a force generated by a pressure differential (i) between the gas storage chamber and the chemical supply chamber, (ii) between the gas storage chamber and the reference pressure chamber, or (iii) between the chemical supply chamber and the reference pressure chamber. In another embodiment, the gas generator may include a spring connected to at least one element, and the feedback system may utilize the differential between a pressure in at least one of the chambers acting upon the element and the force of the spring acting upon that same element.

The chemical supply may be provided in various forms. For example, the chemical supply may be a solid, liquid, gas dissolved in a liquid, or combination of a liquid and a gas dissolved in a liquid. The chemical supply may include any chemical hydride, aqueous $NaBH_4$, or solution of $NaBH_4$ and at least one alkali metal salt, in which case the aqueous $NaBH_4$ solution may include an effective amount of co-solvent or other additive. In another embodiment, the chemical supply is an aqueous $NaBH_4$ solution that decomposes in the presence of the catalyst to produce hydrogen gas, where the catalyst may be selected from at least one of the following catalysts: Ruthenium (Ru), Rhodium (Rh), Palladium (Pd), Iridium (Ir), Platinum (Pt), Rhenium (Re), and Nickel (Ni). In yet another embodiment, the chemical supply may include $NaBH_4$ stored as a dry powder. The dry powder may be caused to mix with a predetermined liquid either (i) by breaking a membrane containing the dry $NaBH_4$ powder, (ii) by shaking or squeezing the gas generator, or (iii) by puncturing the membrane.

The generated gas may be many types of different gases. Two cases include hydrogen gas and oxygen ($O_2$) gas. These gases can be used in various applications, including, for example: (i) fuel cell applications that react hydrogen gas and oxygen to generate electricity, (ii) torches that burn hydrogen gas, or (iii) oxygen respiratory devices that provide substantially pure oxygen to medical patients. It should be understood that there are many other applications that use either of these two gases, and still further applications that use other gases. It should be understood that the principles of the present invention are not limited to or by the type of gas generated by the example embodiments described herein.

Some of the gas generator embodiments described herein include some or all of the following safety and operational features that make it useful for many applications. These features in no particular order may include: automatic gas production sufficient to match consumption rates, compact or large design, orientation insensitivity, high level of system safety, and automatic limiting of hydrogen gas or other gas production so that the gas generator cannot have a runaway reaction. For example, if hydrogen gas pressures become too large (i.e., too much hydrogen gas is being produced), the system may automatically shut itself down.

In another example embodiment, the gas generator generates the gas using bang-bang control. In this "bang-bang" example embodiment, the gas generating device comprises a chemical supply chamber defining a volume configured to contain a chemical supply. The chemical supply chamber includes an element configured to expose a catalyst contained within the chamber to the chemical supply with a self-adjusting duty cycle as a function of pressure internal to the chamber relative to pressure external from the chamber to generate and output a gas in an orientation-independent manner. Orientation-independence as used herein means that generated gas, but not the chemical supply, exits the chemical supply chamber regardless of the physical orientation of the gas generating device. A "self-adjusting duty cycle" as used herein means that the gas generating device self-adjusts for changes in fuel concentration, catalyst effectiveness, gas demand, or combinations thereof.

In the "bang-bang" embodiment, the element may define a portion of a boundary of the chamber.

The chemical supply chamber may be disposed within a cavity defined by a body of the gas generating device, and the element and the body may define complementary features having respectively thereon the catalyst or a displacer.

Operationally, in the bang-bang embodiment, the element moves between ON and OFF positions or physical orientations in response to a sum of forces on it. These forces result from pressure internal to the chemical supply chamber, pressure of an opposing reference pressure external from the chemical supply chamber, and a forcer (e.g., a spring).

In one embodiment, when the pressure in the chemical supply chamber is above a predefined threshold, the element is positioned relative to the body of the gas generating device such that the complementary features are in contact with one another, with the displacer displacing chemical from the catalyst as the complementary features come into contact with one another, thus turning OFF the gas generating device (i.e., setting the device in the OFF state). In the same embodiment, when the pressure in the chemical supply chamber is below a predefined threshold, the element is positioned relative to the body such that the complementary features are apart from one another to expose the catalyst to the chemical supply, thus turning ON the gas generating device (i.e., setting the device in the ON state).

In the bang-bang embodiment, the element and the body may define multiple complementary feature having respectively thereon the catalyst or the displacer, in which case the multiple complementary features may be configured to expose the catalyst to the chemical supply and remove the chemical supply from the catalyst, where complementary features act in parallel with each other to have catalytic reactions occur at multiple complementary feature pairs simultaneously, where each feature pair includes catalyst and a displacer.

In one example of the bang-bang embodiment, the element and catalyst are coupled to each other, e.g., the catalyst is in or on the element in a body-facing direction. Alternatively, the catalyst may be coupled to the body, e.g., in or on the body in a chamber-facing direction. In both embodiments, the element may be configured to move relative to the body in a translational or rotational motion. It should be understood that the catalyst may still further alternatively be applied to an insert, and the insert may be affixed to the body or the element, where using an insert may be useful for quick replacement of catalyst while maintaining the same body or body and element, respectively, across catalyst replacement.

In another example bang-bang embodiment of the gas generating device, the gas generating device defines three chambers therein, including a gas storage chamber, the chemical supply chamber, and a reference pressure chamber. In one configuration, the gas generating device further comprises a gas permeable, liquid impermeable membrane separating the gas storage chamber from the chemical supply chamber, and the element separates the chemical supply chamber from the reference pressure chamber. This embodiment includes a gas passage spanning between the chemical supply chamber and gas storage chamber, that, in combination with another gas flow path in some embodiments, enables an orientation-independent flow of generated gas, but not liquid, from the chemical supply chamber to the gas storage chamber.

In still another example bang-bang embodiment of the gas generating device, the device includes a forcer, such as a spring, coupled to the element to exert a force to enable the element to move as a function of the pressure internal to the chemical supply chamber relative to pressure in the reference pressure chamber, with the forcer positioned in the reference pressure chamber. A detent may be employed at an interface of the element and body of the device to provide a small resistance that can be overcome by a sum of forces on the element above or below the same or different thresholds. The detent can be set to provide hysteresis to maintain a position or orientation of the element relative to the body (i.e., to maintain the ON state or OFF state of the device) absent a threshold change in pressure differential between the chemical supply chamber and reference pressure chamber.

During operation of the bang-bang embodiment of the gas generating device, during a transition from an ON state to an OFF state that define states of the duty cycle, the chemical supply may be removed from the catalyst.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 10A-10C are mechanical schematic diagrams of a "bang-bang" control embodiment of a gas generator.

DETAILED DESCRIPTION OF THE INVENTION

A description of preferred embodiments of the invention follows.

Figure 1:
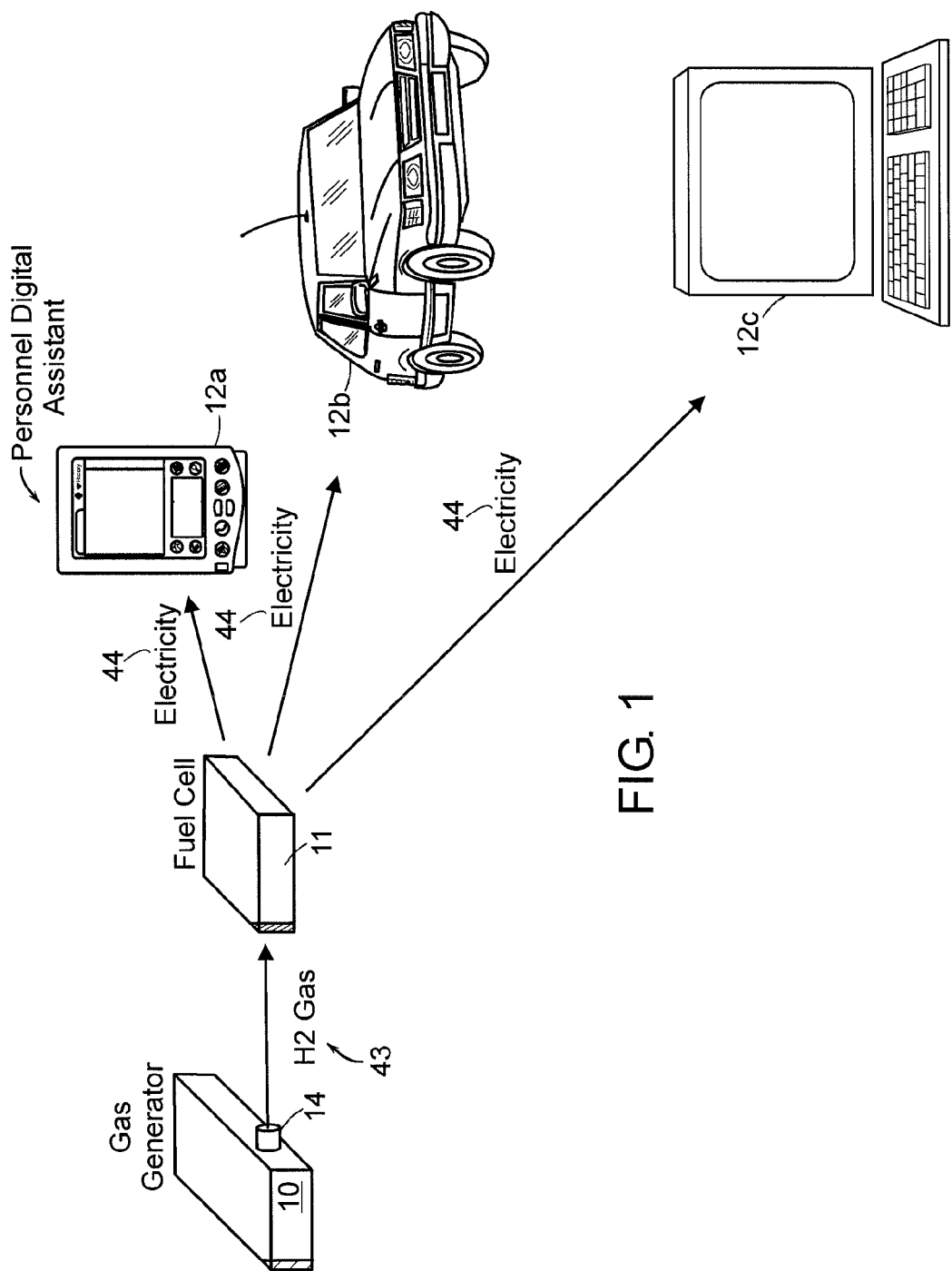
FIG. 1 is a graphical diagram of a fuel cell application in which a gas generator according to the principles of the present invention may be employed.

FIG. 1 is a graphical diagram of a fuel cell application in which a gas generator 10 according to the principles of the present invention may be employed. In the fuel cell application, the gas generator 10 generates and delivers hydrogen gas to a fuel cell 11. The fuel cell 11 reacts the hydrogen gas and oxygen to produce electricity 44, as well known in the art. The fuel cell 11 provides the electricity 44 to an electricity-consuming device, such as a personal entertainment device 12a (e.g., MP3 player), remote controlled car 12b, or portable computer 12c. Other fuel cell applications include military electronics, industrial electronics (e.g., printing presses), or consumer electronics (e.g., cellular telephones, Personal Digital Assistants (PDA's), and so forth).

Generally, a fuel cell consumes hydrogen gas at a rate depending on the power its generating. An example fuel cell is described in U.S. Pat. No. 6,312,846, issued Nov. 6, 2001; the entire teachings of which are incorporated herein by reference. In that patent, a fuel cell is described that, in some embodiments, can change its configuration in a dynamic manner, responsive to its load. For example, at times there is more load, the fuel cell can dynamically configure itself to consume more fuel to meet power demand, and at times there is less load, the fuel cell can dynamically configure itself to conserve fuel.

There are many different sizes and configurations that the gas generator 10, fuel cell 11, or integrated combination(s) can take. For purposes of describing the principles of the present invention, however, the sizes, both absolute and relative, and interfacing of these devices are unimportant. What is important is (i) the process and example gas generator embodiments for generating gas and (ii) the relationship between the rate of gas usage by the fuel cell 11 and rate of gas generation by the gas generator 10. In the case of generating gas for the fuel cell 11, the gas generator 10 generates hydrogen gas.

The ability to generate relatively pure hydrogen gas, hydrogen gas, by reaction of metal hydrides or other appropriate solid reactants dissolved in water is well known. One particular hydride, sodium borohydride, $NaBH_4$, has been used for over 50 years as a convenient, safe source of hydrogen gas. When $NaBH_4$ powder is dissolved in water, it forms a slightly alkaline, low pressure, non-flammable solution. When this aqueous solution is exposed to selected metals, combination of metals, metal boride catalysts, or even heat, hydrogen gas is rapidly evolved together with water-soluble sodium borate. This catalytically driven, decomposition (hydrolysis) reaction may be written as:

$$NaBH_4(aq) + 2H_2O(l) \rightarrow 4H_2(g) + NaBO_2(aq) \quad \text{(Equation 1)}$$

In Equation 1, which describes a hydrolysis reaction, water ($H_2O$) is a reactant—two water molecules are consumed for every four molecules of hydrogen gas generated. As this reaction continues to generate hydrogen gas, the remaining $NaBH_4$ solution near the catalyst becomes more concentrated in $NaBH_4$ since there is less free water available. While decreased water supply in the bulk $NaBH_4$ solution is not a direct problem, the other reaction product of Equation 1, sodium borate, $NaBO_2$, is formed in the presence of less water. This results in a more concentrated solution in the vicinity of the catalyst. Sodium borate is water soluble, but not very water soluble. This means that when hydrogen gas is generated and, simultaneously, $NaBO_2$ product is formed, some $NaBO_2$ may begin to precipitate and deposit on or near the catalyst. Build-up of $NaBO_2$ on the catalyst can eventually reduce the subsequent activity of the catalyst or other gas generating device. This can be a serious problem anytime $NaBH_4$ solution contacts a catalyst.

To overcome this problem, as will be shown in accordance with some embodiments of the gas generator 10 according to the principles of the present invention, the gas generator 10 exposes the catalyst (e.g., moves the catalyst into or out of the $NaBH_4$ solution) in a self-regulating manner. In a piston-type embodiment, catalyst position (i.e., the depth to which the selected catalyst is immersed in $NaBH_4$ solution) controls hydrogen gas generation rates. Because the reservoir of $NaBH_4$ solution in the device is relatively large compared to the surface area of the catalyst, any $NaBO_2$ formed during hydrogen gas generation tends to remain soluble and in solution. Even if the solubility limit of $NaBO_2$ is eventually exceeded, $NaBO_2$ precipitates and deposits elsewhere in the $NaBH_4$ solution, and not necessarily on the catalyst surface. Thus, catalyst lifespan is extended.

Furthermore, in the piston-type embodiment, the depth the supported catalyst on the piston is immersed in $NaBH_4$ solution is controlled by a mechanically simple, pressure related, feedback system. This feedback system automatically senses a build-up or decrease in hydrogen gas pressure based on hydrogen gas consumption by a fuel cell or other hydrogen gas utilizing device. In other words, when the hydrogen gas consuming device requires less hydrogen gas, such as when the electrical load on the fuel cell 11 is small or zero, the hydrogen gas generator 10 senses this decreased demand and ceases producing hydrogen gas. In addition, the feedback control system for regulating hydrogen gas generation rates is mechanically simple in some embodiments, i.e., does not involve bulky or expensive pressure sensing feedback controllers and/or mechanical pumps. The principles of the present invention allows the gas generator 10 to operate free of electrically driven mechanical pumps or wicking agents to move the chemical supply (e.g., $NaBH_4$ solutions) since the mechanical solution is exposed to the catalyst in a chemical supply chamber. This design is therefore suitable for potentially low cost, portable applications and is orientation insensitive.

Other embodiments that use elements besides pistons, hollow or solid, that put catalysts in the presence of a chemical supply are also within the scope of the principles of the present invention. For example, the catalyst may be associated with a disk, rod, sphere, or combination thereof that rotate(s) to expose the chemical supply to the catalyst by increasing or decreasing an amount of catalyst to which the chemical supply is exposed. The feedback system in rotating catalyst embodiments may be similar to or different from translating (e.g., piston-type) embodiments. Example feedback systems that support the translating or rotating embodiments are described hereinbelow. The pistons, disks, spheres, and so forth may be generally referred to herein as an "element." The elements are closed to passage of the chemical supply and interact with the chemical supply. "Closed to passage" of the chemical supply means that substantially no chemical supply enters the element(s) or, in some other embodiments, allows some chemical supply to enter but includes structure that prevents the chemical supply from flowing through to the gas storage chamber.

In some embodiments, the generated gas produced by the catalyst and chemical supply may pass through the element(s). In other embodiments, the element(s) are solid, and the gas passes from the chemical supply chamber to the gas storage chamber without passing through the element(s).

The illustrative examples described herein primarily describe hydrogen gas generation for use in a fuel cell application. In the fuel cell application, the hydrogen gas is generated from a particular aqueous chemical hydride solution, but the gas generator 10 is not limited to generating hydrogen gas from particular chemical hydride or particular aqueous solutions. In a broader, general sense, the concepts and mechanical designs described herein may be generally applied to any gas generation system where a particular gas is generated in a self-regulated manner from any gas, liquid, mixture, or even solid chemical by means of a selected catalyst, device, or element.

In some embodiments, a catalyst is associated with a small element (e.g., piston or disk) that moves the catalyst into or out of a larger volume of $NaBH_4$ chemical supply. This has advantages over moving the chemical supply to the catalyst in that it is easier, safer, and less energy intensive to move a small piston or disk than it is to move a relatively large amount of liquid chemical.

Figure 2A:
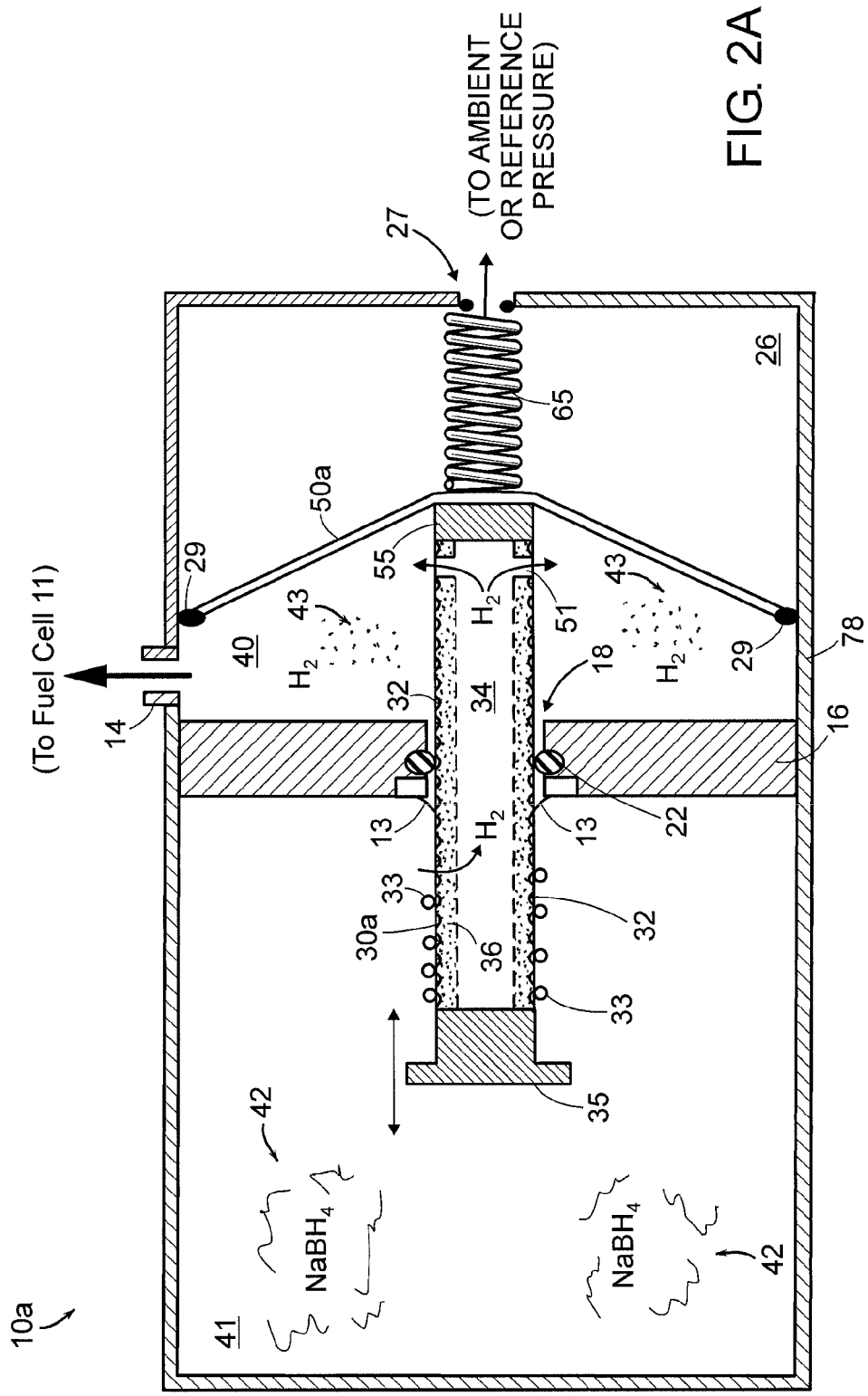
FIG. 2A is a schematic diagram of the gas generator of FIG. 1.

FIG. 2A shows a first embodiment of the self-regulating gas generator 10a of FIG. 1. The gas generator 10a has three chambers: a chemical supply chamber 41 (left), a generated gas storage chamber 40 (middle), and a reference pressure chamber 26 (right).

In the case of generating hydrogen gas for a fuel cell 11, for example, the chemical supply chamber 41 stores an aqueous $NaBH_4$ solution 42. It should be understood the general design concept described herein is not limited to sodium borohydride ($NaBH_4$) or indeed even a chemical hydride. Any solid, liquid, or gas that, under suitable conditions, can generate a desired specific gas (e.g., hydrogen gas) when exposed to a selected catalyst may be substituted for the aqueous $NaBH_4$ solution 42.

In the embodiment of FIG. 2A, the chemical supply chamber 41 and gas storage chamber 40 are separated by a solid wall or partition 16 having a hole 18 cut or formed through it. Into this hole 18, an element 30a, such as a hollow piston 30a, is fitted. The hole 18 preferably matches the shape of the cross-section of the piston 30a. The hollow piston 30a is designed and constructed in such a way that it can easily move back and forth between the two chambers 40, 41. The hollow piston 30a slides through an appropriately fitted seal (e.g., an o-ring) 22, which is installed in such a way in the hole 18 that substantially no liquid or gas travels between the piston 30a and wall 16 to or from the chemical supply section 41 and the gas storage section 40. It should be understood that the piston 30a may also have noncircular, cross-section geometries (e.g., rectangular or oval), and its internal cavity or channel 34 may be subdivided into multiple channels (i.e., the piston 30a may include internal support walls or structures (not shown)).

In the embodiment of FIG. 2A, the gas storage chamber 40 is defined by the partition 16, an elastic or "springed" diaphragm 50a, and possibly a portion of a body 78 of the gas generator 10a. The gas storage chamber 40 may have one or more gas outlets 14 by which the generated gas 43 can be controllably released to the fuel cell 11 or other gas consuming system, e.g., hydrogen gas combustion engine. The minimum and maximum volume of the gas storage chamber 40 may be determined based upon the transient response required. Thus, the volume of gas necessary for the gas storage chamber 40 to be able to store can be determined by techniques well known in the art.

The reference pressure chamber 26 can be vented via a vent 27 to atmospheric pressure or other reference pressure. The reference pressure, which sets the absolute operating pressures of the gas generator 10, applies a constant opposing force to the elastic diaphragm 50a. The elastic diaphragm 50a is sealed at peripheral seals 29 at its periphery to prevent product gas in the gas storage chamber 40 from leaking into the reference pressure chamber 26. In this embodiment, the elastic diaphragm 50a expands and contracts as a function of differential pressure between the gas storage chamber 40 and reference pressure chamber 26.

The piston 30a is attached to the elastic diaphragm 50a and extends into and withdraws out of the chemical supply chamber 41 as the elastic diaphragm 50a contracts and expands, respectively. A spring 65 may supply a biasing force to the elastic diaphragm 50a, and, in turn, apply biasing force to the piston 30a to bias the elastic diaphragm 50a with a force. Further details of how pressures and the spring force affect gas generation are presented below in reference to a continued description of FIG. 2A and a description of FIGS. 4A-4C. Before those descriptions, further details of the piston 30a and catalyst 32 associated therewith is presented in reference to FIG. 3.

Figure 3:
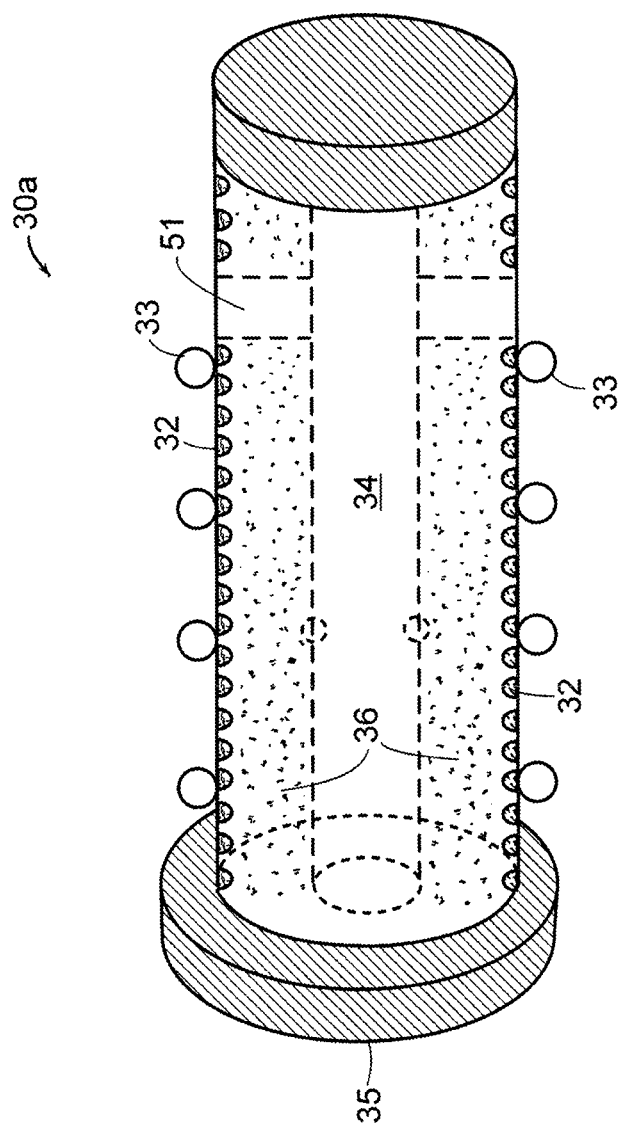
FIG. 3 is a detailed mechanical diagram of an element (e.g., piston) in the gas generator of FIG. 2A used to move catalyst into and out of a chemical supply to generate gas.

FIG. 3 is a close-up view of the hollow piston 30a of FIG. 2A. The hollow piston 30a may be constructed of, covered with (e.g., a sleeve), or coated with a gas permeable structure 36 (e.g., a film, membrane, or other appropriate porous material) of the type that allows hydrogen gas (or in a general sense, any gas of interest) to pass through it. However, water, water vapor, or dissolved salts, such as $NaBH_4$, $NaBO_2$, or NaOH are unable to pass through the gas permeable structure 36. In other words, the gas permeable structure 36 surrounding the hollow piston 30 is more permeable to hydrogen gas molecules (for example) than to molecules of water or $NaBH_4$. Thus, any hydrogen gas generated in the chemical supply chamber 41 preferentially permeates through this gas permeable structure 36. Gas exit holes 51 are provided on the right side of the piston 30a to exhaust generated gas 43 from the cavity 34 to the gas storage chamber 40.

Examples of suitable gas permeable structures 36 for hydrogen gas, such as palladium metal foil, are well known in the art. Other examples include, but are not limited to, polymer materials, such as polypropylene that is deliberately etched to allow small molecules, such as hydrogen gas (or any appropriate gas), to permeate. Still other examples include porous gas permeable polymers, such as PBO (polyphenylene-2,6-benzobisoxazole), or PVDF (polyvinylidene fluoride). Alternatively, materials such as silicone rubber may be used.

Continuing to refer to FIG. 3, the hollow piston 30a is covered with or comprises hydrogen gas permeable features (not shown), such as holes or pores. The gas permeable features may be selectively coated or embedded with a thin layer of a selected catalyst 32. In other embodiments, the catalyst 32 may be applied to the piston's lateral surface(s) alongside or near the gas permeable features.

In yet another embodiment, the selected catalyst 32 may be formed on or coupled or deposited adjacent to the gas permeable structure 36 such that the catalyst 32 is in close proximity to or covers pores of the gas permeable structure 36.

The piston's chemical supply side end 35 is left uncoated or covered with a non-catalytic material 35 to prevent gas generation when the piston 30a is fully retracted from the chemical supply 42.

The surface of the gas permeable structure 36 or piston 30a may be specially designed with "dimples" or other recessed patterns that support the catalyst 32 in a manner that makes the surface of the structure 36 or piston 30a smooth. A smooth surface of the gas permeable structure 36 or piston 30a forms and maintains a tight seal with the o-ring 22 (FIG. 2A) to maintain separation of the contents of the chemical supply chamber 41 and the gas storage chamber 40. The location of the catalyst 32 and the gas permeable structure 36 may be co-located so that gas bubbles 33, formed as a result of the chemical reaction between the chemical supply 42 and catalyst 32, find their way quickly via pressure differential to the gas permeable structure 36. In this embodiment of the piston 30a, the hydrogen gas in the gas bubbles 33 flows through the pores to the hollow cavity 34 in the piston 30a.

The particular type of catalyst 32 selected is of the type known to catalyze the decomposition of $NaBH_4$ solutions. In a general sense, any gas generating catalyst may be selected. Examples of catalysts include Ruthenium (Ru), Rhodium (Rh), Palladium (Pd), Iridium (Ir), Platinum (Pt), Rhenium (Re), and Nickel (Ni) metals, combination of metals, or metal borides. These catalysts can either be used alone or in combination with each other, as is well known in the art. Alternatively, the gas permeable structure 36 may be made of a metal or any other material that is not only permeable to hydrogen gas but is also catalytic towards decomposition of $NaBH_4$ solutions. Examples of such structures 36 include transition metal films with catalytically active exterior surfaces, such as Palladium, Palladium alloys, or any layered films with hydrogen gas permeable structure 36 and a surface that is itself catalytic active towards $NaBH_4$ decomposition.

Referring again to FIG. 2A, the catalyst coated, hollow piston 30a is freely movable between the chemical supply chamber 41 containing aqueous $NaBH_4$ solution 42 and the gas storage chamber 40 containing generated gas 43. The hollow piston 30a can either be positioned so that it is entirely in the chemical supply chamber 41, entirely in the gas storage chamber 40, or somewhere in-between the two chambers 40, 41.

The gas generator 10a described herein may be constructed with a sponge-like absorbent material (not shown) deliberately placed in the gas storage chamber 40 to absorb (or even neutralize) any $NaBH_4$ solution (or any other condensed liquid) that leaks or otherwise passes through from the chemical supply chamber 41.

The hollow piston 30a or the partition 16 is designed to prevent fuel from leaking into the gas storage chamber 40 or otherwise improve performance. For example, as suggested above, the left end 35 of the piston 30a (i.e., the end that is inserted into the NaBH$_4$ solution 42) is sealed with a solid impermeable material 35 or a separate element, which is sometimes referred to as an end cap 35. The impermeable material 35 or end cap 35 prevents NaBH$_4$ solution from entering the hollow piston 30a and passing through to the hydrogen gas storage chamber 40. The impermeable material 35 or end cap 35 also helps prevent leakage of the chemical supply 42 to the gas storage chamber 40 when the piston 30a is fully retracted (i.e., when the piston 30a is completely out of the NaBH$_4$ solution 42 during zero (or very low) hydrogen gas demand).

As also described above, appropriate seals 22 (e.g., o-rings or other suitable sealing material) may be installed in the partition hole 18 to prevent chemical supply leakage through two paths to the gas chamber, where the two paths are (i) along the lateral surface of the piston 30a and (ii) between the seals 22 and the partition 16. Additionally, the piston 30a can be designed to slide through or pass adjacent to a brush 13 or other flexible device that, by moving against the piston 30a, prevents or reduces solid products from adhering to or building-up on the piston 30a. This anti-fouling action effectively extends catalyst lifespan. Having a smooth surface on the piston 30a against which the brushes 13 contact improves their performance.

Other brush designs may also be employed to provide anti-fouling action. It should be understood that the brushes 13 do not impose a significant resistance on the movement of the piston 30a.

In operation of the gas generator 10 illustrated in FIG. 2A, the piston 30a is attached to the elastic diaphragm 50a and, therefore, moves in response to the pressure in the gas storage chamber 40. A constant resistive force is applied in a right-to-left direction by the pressure in the reference pressure chamber 26. The reference pressure chamber 26 may also contain a spring 65 that augments the reference pressure force directed to the elastic diaphragm 50a. So, if the reference pressure chamber 26 is not vented, the confined inert gas stored therein acts like an air spring. Thus, as the piston 30a moves increasingly to the right by gas pressure that increases within the chemical supply 42 as a result of its reacting with the catalyst 32, the elastic diaphragm 50a or spring 65 increasingly resists the hollow piston 30a.

Figure 4A:
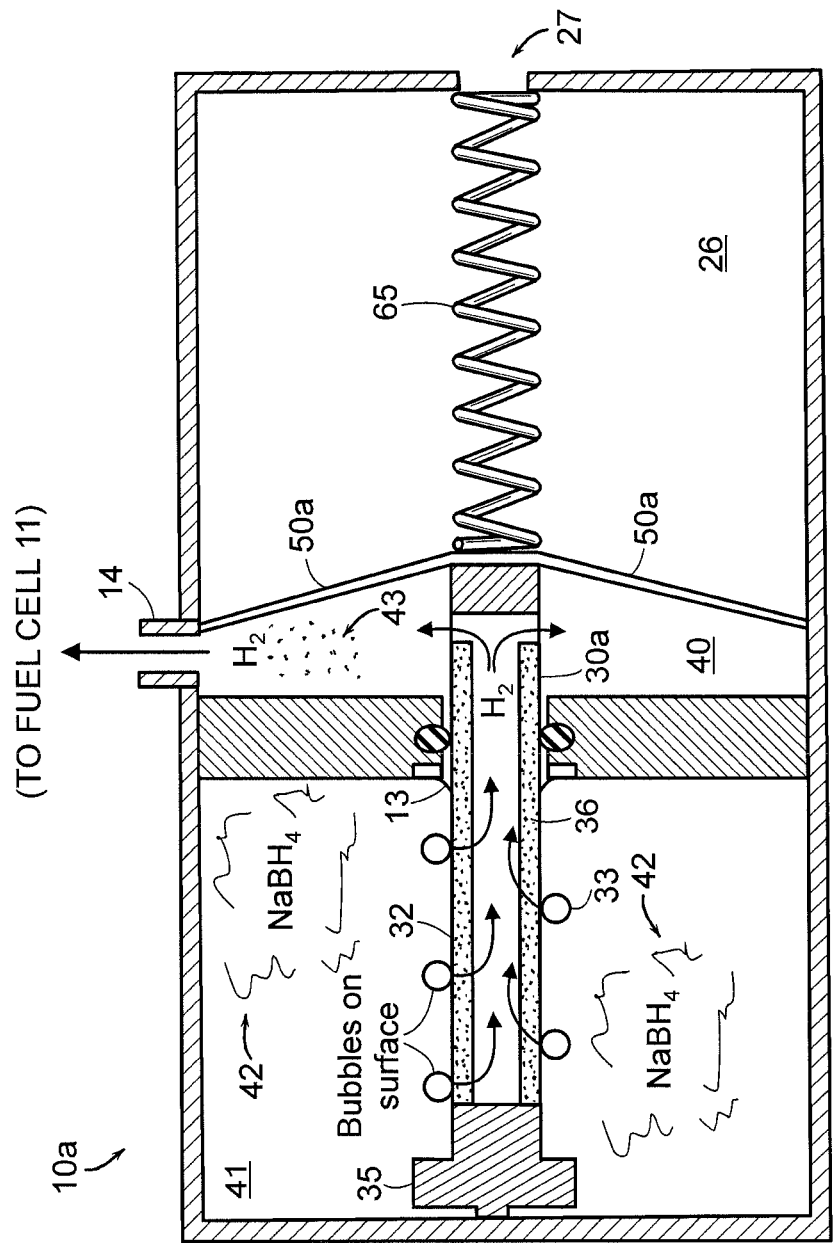
FIGS. 4A-4C are schematic diagrams illustrating operation of the gas generator of FIG. 2A.
Figure 4B:
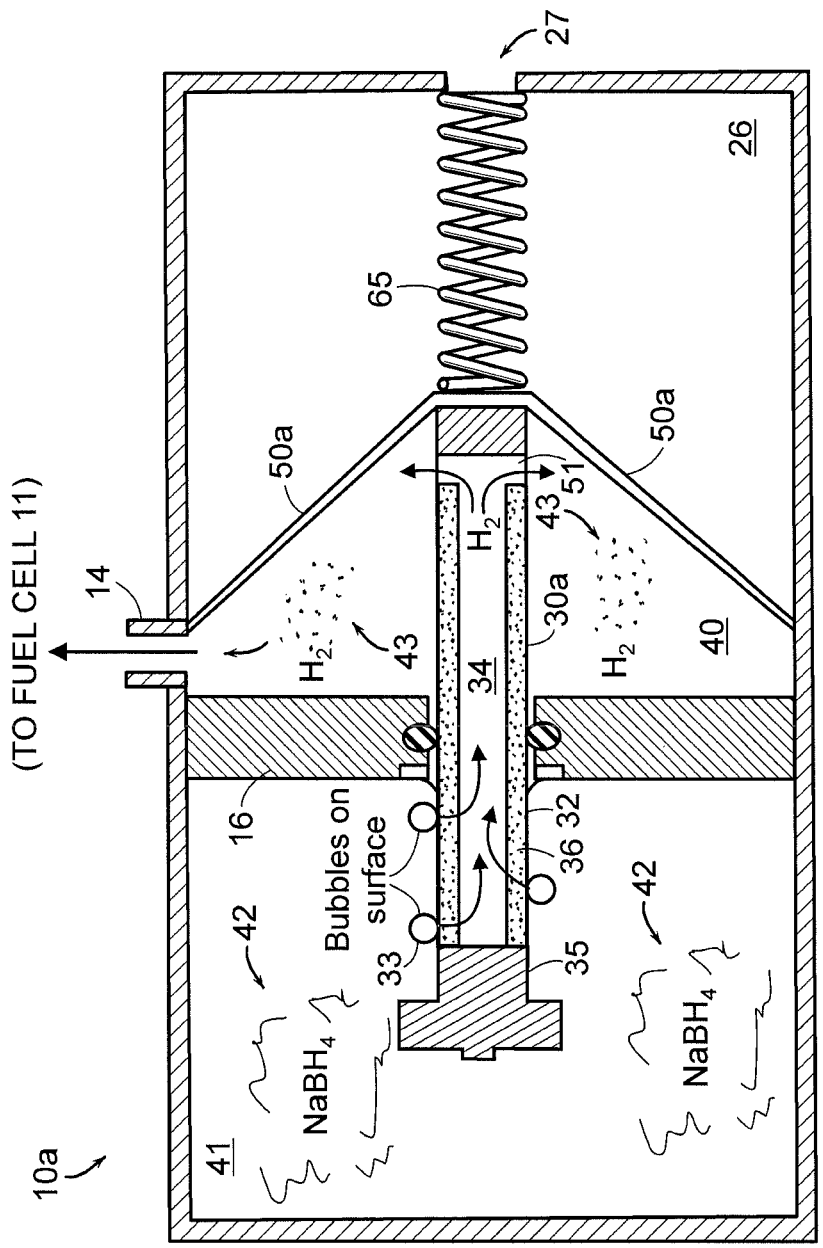
Figure 4C:
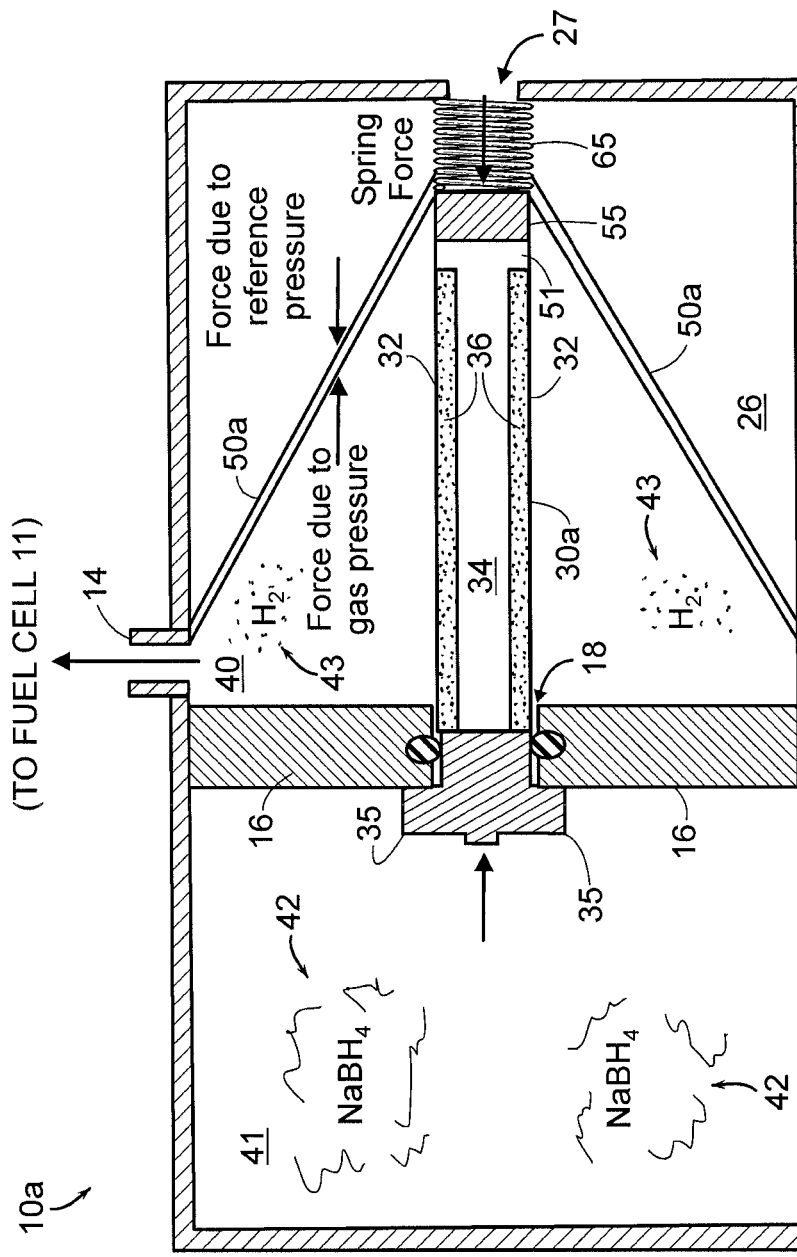

Before describing FIGS. 4A-4C, which further illustrate operation of the self-regulating gas generator 10a of FIG. 2A, a brief description of a start-up process for the embodiments of the gas generator 10a illustrated in FIG. 2A is presented. The start-up process now described also applies to FIG. 2B.

Referring to FIG. 2A, before initial use, the pressure of the chemical supply 42 is ambient, which prevents chemical supply leakage during storage. Also, the chemical supply 42 is kept separated from the catalyst rod 30a so that no gas is generated. In a first shipping configuration scenario, this is accomplished by perhaps shipping the gas generator 10a with the piston 30a fully translated out of the chemical supply chamber 41 in a locked position through use of a locking pin (not shown), other suitable mechanism(s), or, for example, rotating the piston 30a to a "locking" position. Upon unlocking the piston 30a, the force due to the spring 65 acting on the piston 30a causes the piston 30a to translate, from right-to-left, into the chemical supply 42.

In a second shipping configuration scenario, rather than shipping the gas generator 10a with the piston 30a locked in a position that keeps the catalyst 32 external from the chemical supply 42, the chemical supply 42 may be inert before use due to a separation of chemical supply components. In this second shipping configuration scenario, the chemical supply components are combined just before use by perhaps breaking a separation membrane (not shown) or crushing or adding chemical pellets which ultimately mix to form the active chemical supply 42. It should be understood that any number of other shipping configurations are possible.

Referring to the second shipping configuration scenario, the catalyst rod 30a may be shipped in its fully extended position (i.e., to the left due to the force of the spring 65 exerting a right-to-left force on it) since the chemical supply is inert. Once the chemical supply is activated and the catalyst rod 30a is fully extended into the chemical supply 42, product gas is generated rapidly.

At this point, the external device 11 demands zero amount of gas. Since the chemical fuel pressure is originally ambient, there is no differential pressure across the gas permeable structure 36 on the hollow piston 30a to force the generated gas through the hollow rod 30a and into the gas storage chamber 40. So, the generated gas "foams off" of the catalyst rod 30a and floats to the top of the chemical supply chamber 41. Because the generated gas stays in the chemical supply chamber 41, the pressure in the chemical supply chamber 41 increases. As the pressure in the chemical supply chamber 41 increases, a pressure begins to be exerted on the left end 35 of the rod 30a, which causes it to translate to the right against the resisting spring 65. The spring 65 incrementally removes catalyst from the chemical supply 42. Simultaneously, the differential pressure across the permeable structure 36 increases until the generated gas begins to preferentially flow into the catalyst rod 30a rather than foaming into the chemical fuel chamber 41. The generated gas 43 begins to increase the pressure in the gas storage chamber 40, which, in turn, exerts a force, left-to right, on the elastic diaphragm 50a and, therefore, the piston 30a. As the pressure in the chemical fuel chamber 41 further increases and more gas flows into the gas storage chamber 40, there is a point at which the piston 30a positions the catalyst 32 fully withdrawn from the chemical supply 42. Since there is no generated gas 43 demanded by the fuel cell 11 before switching it on, the gas generator 10a is now in its "primed" state ready to deliver regulated gas on demand.

The start-up sequence of the other embodiments, FIGS. 5A, 5B, 6A, 7, and 8 is similar to the start-up sequence of FIG. 2A with the exception that they do not utilize a hollow rod 30a and diaphragm 50a. For these solid rod 30b instances, the same separation of chemical supply 42 and catalyst 32 is required before initial use. Upon initial activation, the catalyst rod 30a is fully extended into the chemical supply 42 by the spring 65, and the chemical supply pressure is the same as the reference pressure. Generated gas is evolved and floats through the chemical supply 42 to the top of the chemical supply chamber 41, ultimately resting against the permeable structure 36. The gas then flows through it into the gas storage chamber 40 due to the increasing differential pressure between the chemical supply 42 and the gas storage chamber 40. As the chemical supply pressure increases, the catalyst rod 30b translates left-to-right and ultimately out of the chemical supply 42, which stops the gas generation. Since there is no gas demanded by the fuel cell 11 before switching it on, the gas generator 10 is now in its "primed" state, ready to deliver regulated gas on demand Referring now to FIG. 4A, the piston 30a may be shipped in a "locked" position, meaning the piston 30a (and catalyst 32) is entirely external from the NaBH$_4$ solution 42, as described above in reference to the first shipping configuration scenario. A user sets the piston 30a in an "unlocked" position by disengaging a latch, detent, or other securing mechanism (not shown) to allow the piston (and catalyst 32) to enter the $NaBH_4$ solution 42, which begins a self-regulating process, described immediately below.

Continuing to refer to FIG. 4A, the start of the self-regulating process begins with the piston 30a initially positioned entirely in the chemical supply chamber 41. As described above in reference to the start-up sequence for FIG. 2A, upon exposure of the catalyst 32 on the piston 30a to the $NaBH_4$ solution 42, hydrogen gas is catalytically generated. During this hydrogen gas generation step, hydrogen gas bubbles 33 form in the $NaBH_4$ solution 42 near the catalyst 32, coalesce, and contact the gas permeable structure 36. These bubbles 33 are driven through the gas permeable structure 36 by differential pressure. Then, after the gas exits the bubbles 33 and enters the hollow piston 30a, the gas 43 travels through the hollow piston 30a and enters the hydrogen gas storage chamber 40 of the gas generator 10a.

The depth to which the catalyst coated piston 30 is immersed in the aqueous $NaBH_4$ solution 42 ultimately controls the hydrogen gas generation rate. If the catalyst coated piston 30a is pushed entirely into the chemical supply chamber 41 (FIG. 4A), the hydrogen gas generation rate is at its maximum since a large amount of catalyst surface area is exposed to the $NaBH_4$ solution 42.

In FIG. 4B, the catalyst coated, hollow piston 30a is positioned between the chemical supply chamber 41 and gas storage chamber 40. In this case, the hydrogen gas generation rate is between the maximum hydrogen gas generation rate and zero and represents a typical operating condition that accommodates fluctuations in gas demand.

In FIG. 4C, the piston 30a is entirely in the gas storage chamber 40. In this case, no hydrogen gas 43 is generated from $NaBH_4$ solution 42 since no catalyst 32 is exposed to the $NaBH_4$ solution 42. As long as the piston 30a remains fully in the gas storage chamber 40, the hydrogen gas generation rate remains at zero.

Now that the basic operating principles of the gas generator 10 have been described, a detailed description of a feedback system, and how the feedback system of the gas generator 10 operates, is presented.

In general, the feedback system utilizes force generated in part by pressure in at least one of the chambers 40, 41 to position the catalyst 32 in the chemical supply 41 to regulate rate of generation of the generated gas 43. The feedback system may include a subset of the following components in some embodiments: piston 30a, elastic diaphragm 50a, spring 65, reference pressure chamber 26, gas storage chamber 40, or chemical supply chamber 41.

Referring to FIG. 4C, the position of the piston 30a is determined by an equilibrium of four forces: (1) a force exerted left-to-right on the left end 35 of the piston 30a due to pressure in the chemical supply chamber 41; (2) pressure of the gas 43 in the gas storage chamber 40 acting from left-to-right on the elastic diaphragm 50a, which, in turn, exerts force on the piston 30a from left-to-right; (3) pressure of the reference pressure chamber 26 acting from right-to-left on the elastic diaphragm, which, in turn, exerts force on the piston 30a from right-to-left; and (4) force exerted on the piston 30a by the spring 65.

Other embodiments described herein may include the same or other components as part of the feedback system. Equivalent structures or functions known in the art may be used in place of or in concert with the structures or functions composing the feedback system as described herein.

Continuing to refer to the operation of the gas generator 10a of FIGS. 2A and 4A-4C, when demand exists for hydrogen gas (i.e., the fuel cell or other hydrogen gas consuming device is under load and is consuming hydrogen gas), the gas pressure in the gas storage chamber 40 decreases. The lower hydrogen gas pressure causes the elastic diaphragm or flexible diaphragm 50a to be less extended and therefore move to the left (i.e., towards the chemical supply chamber 41), which reduces the volume of the gas storage chamber 40. As the flexible wall 50a moves towards the left, it simultaneously pushes the catalyst coated piston 30a towards the left and into the $NaBH_4$ solution 42. Since high surface area catalyst 32 on the hollow piston 30a is now exposed to $NaBH_4$ solution, the hydrogen gas generation rate increases.

Hydrogen gas, generated by action of the catalyst 32 in the $NaBH_4$ solution 42, rapidly diffuses through the gas permeable structure 36, through the hollow piston 30a, and towards the hydrogen gas storage chamber 40. Hydrogen gas pressure then rapidly builds-up in the hydrogen gas storage chamber 40. As long as the generated hydrogen gas 43 is continuously utilized by the fuel cell 11 (FIG. 1) or other hydrogen gas consuming device, the hydrogen gas pressure in the reference pressure chamber 26 remains low. A significant portion of the catalyst coated piston 30 remains within the chemical supply chamber 41, and the generator 10a continues to generate hydrogen gas at a rate proportional to the load.

When, however, the load on the fuel cell 11 decreases and the hydrogen gas generated is not being used at a rate equal to the rate of generation, unused hydrogen gas 43 accumulates in the gas storage chamber 40. The increased hydrogen gas pressure in the hydrogen gas storage chamber 40 (relative to the pressure in the chemical supply chamber 41) forces the elastic diaphragm 50a to move towards the reference pressure chamber 26. As the elastic diaphragm 50a moves to the right, it simultaneously pulls the catalyst coated piston 30a out of the $NaBH_4$ fuel solution 42 and, thus, the amount of catalyst 32 exposed to $NaBH_4$ solution 42 decreases. This slows the hydrogen gas generating reaction until it matches the rate of use and, when the gas demand is zero, the hydrogen gas generating reaction slows to a stop. Thus, the mechanical feedback system in the gas generator 10 includes very few moving parts and behaves in a self-regulating manner to rapidly regulate hydrogen gas generation.

When the load on the fuel cell 11 increases again and the fuel cell (or other hydrogen gas utilizing device) begins to use hydrogen gas again, hydrogen gas volume and pressure in the gas storage chamber 40 begins to decrease. This reduced pressure allows the elastic diaphragm 50a to once again move back towards the left. This movement simultaneously pushes the catalyst coated, gas permeable, hollow piston 30a back into the $NaBH_4$ solution 42, thereby increasing hydrogen gas generation rates once again, as described above. This movement of the catalyst coated piston 30a in and out of the $NaBH_4$ solution 42 is self regulating. The movement of the piston 30a in and out of the solution has the added advantages of agitating the chemical supply to provide a uniform solution composition and performing a cleaning action to remove reaction residue or other accumulated material (not shown) from the piston 30a.

It should be understood that the principles of the present invention are not limited solely to the embodiments described above. Other mechanical and structural embodiments may accomplish the same self-regulating, gas generating function. These other embodiments may use a piston or suitable moveable element coated with a catalyst, a gas permeable structure, and a pressure feedback system. The other embodiments and components therein may differ from the embodiment of FIG. 2A in relative configurations, shapes, sizes, pressures, gas flow rates, hole designs, movement of the individual components, and other aspects. Such configurations and associated design trade-offs are understood in the art, and some are described hereinbelow.

Figure 2B:
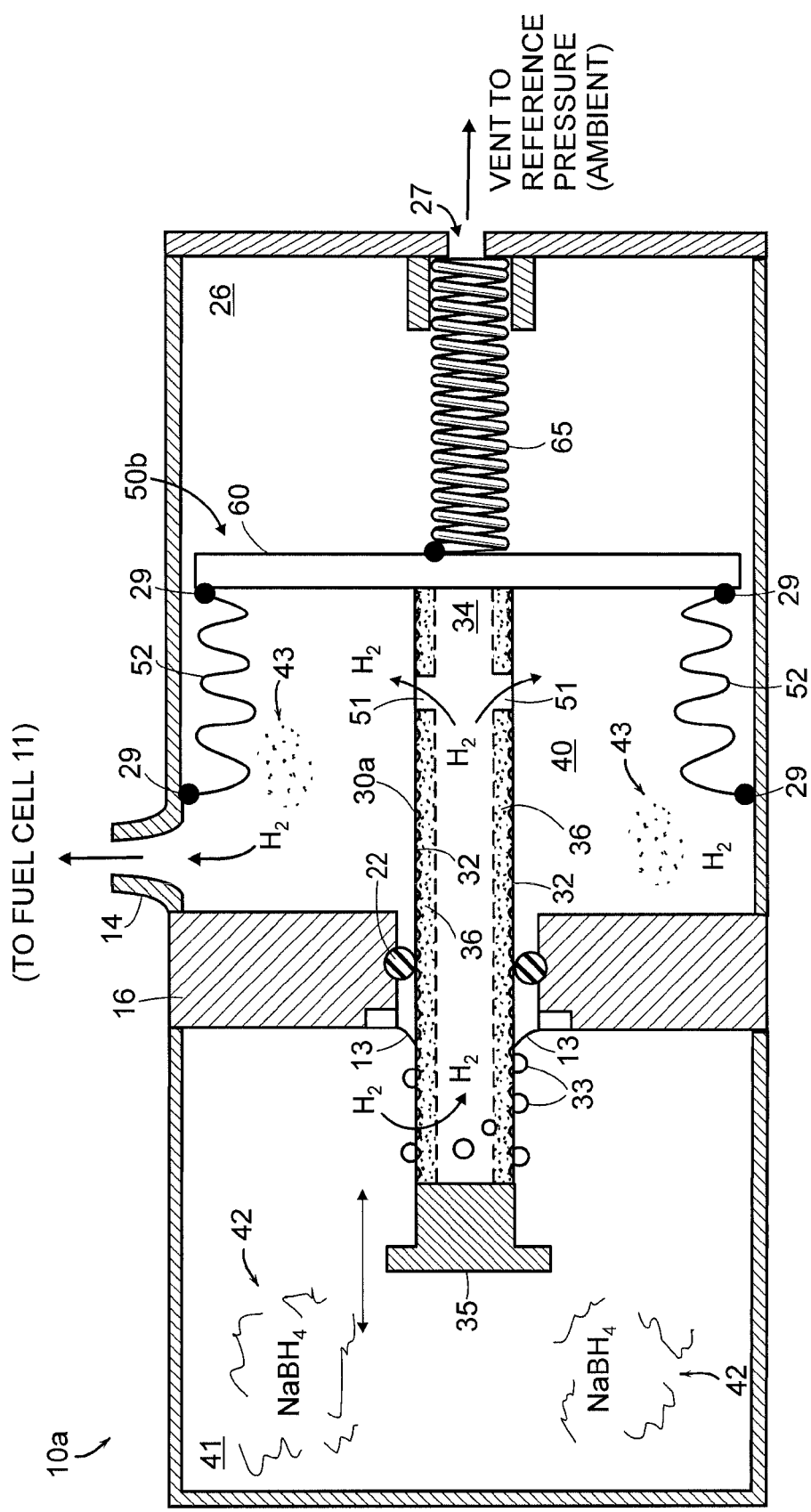
FIG. 2B is a schematic diagram of another embodiment of the gas generator of FIG. 2A.

FIG. 2B, for example, is another embodiment of the gas generator 10a of FIG. 2A. In this embodiment, the elastic diaphragm 50b includes a rigid wall 60 and flexible sealing bellows 52 with peripheral seals 29. The bellows 52 responds to pressure changes by pressing against an adjustable mechanical or gas spring 65. In another embodiment, the restorative force of the bellows 52 and pressure in the reference pressure chamber 26 may be sufficient to dispense with the spring 65. Other than differences between the elastic diaphragm 50b (FIG. 2B) and elastic diaphragm 50a (FIG. 2A), the gas generator 10 of FIG. 2B operates substantially the same as the gas generator 10a of FIG. 2A.

Figure 5A:
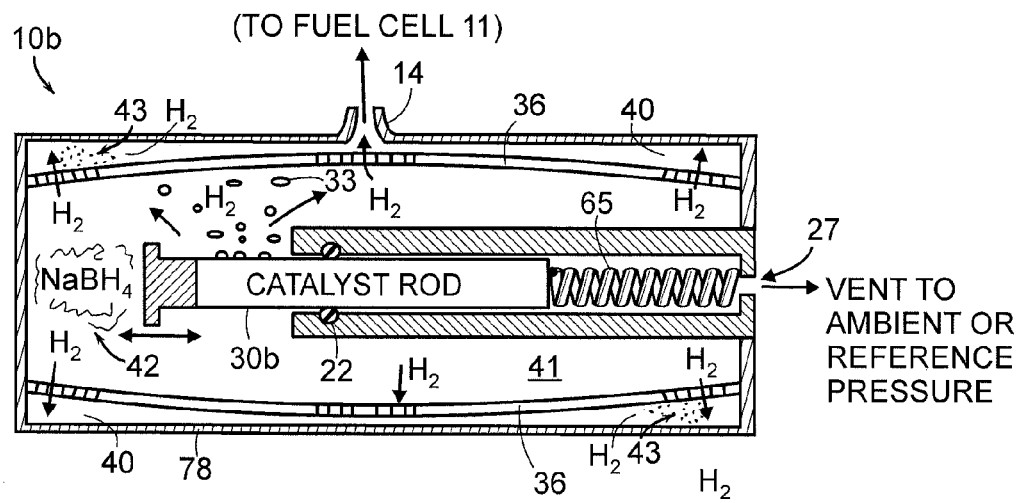
FIGS. 5A and 5B are schematic diagrams of other embodiments of the gas generator of FIG. 1.
Figure 5B:
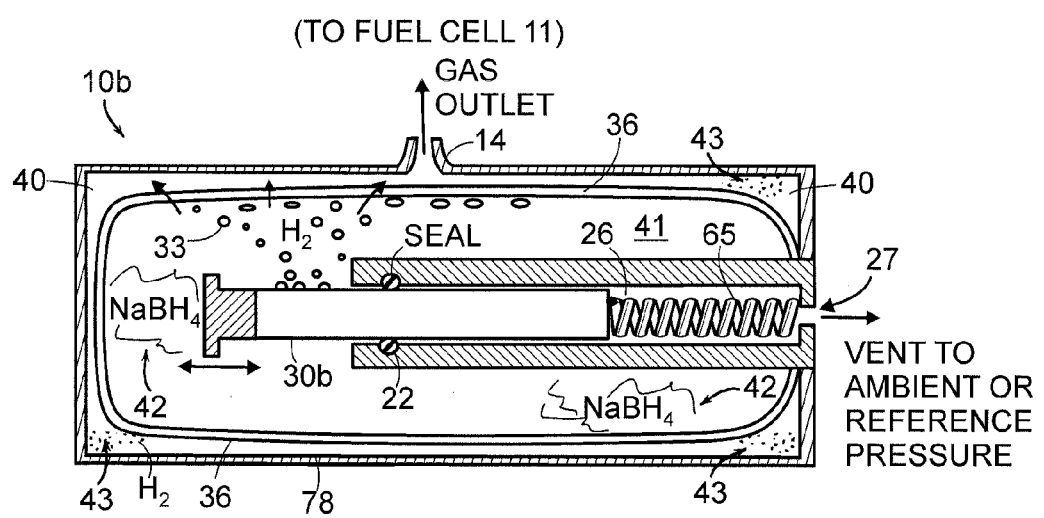

As another example, FIGS. 5A and 5B illustrate embodiments of the gas generator 10b in which the catalyst 32 is deposited on or incorporated into a solid piston 30b and a bladder, which includes the gas permeable structure 36, forms at least a portion of the chemical supply chamber 41. In these embodiments, the gas permeable structure 36 is set apart from the piston 30b at a portion of the perimeter of (FIG. 5A) or surrounds (FIG. 5B) the $NaBH_4$ solution 42. hydrogen gas bubbles 33, generated near the catalyst coated piston 30b, diffuse through the $NaBH_4$ solution 42 and permeate through the gas permeable structure 36 to enter the gas storage chamber 40.

The embodiments of FIGS. 5A and 5B may simplify device construction and operation of the gas generator 10b. Although the catalyst 32 is still associated with piston 30b, the hydrogen gas permeable structure 36 is located a distance away from the catalyst 32. Thus, in these embodiments, there is no need to construct a catalyst layer either near or on top of the gas permeable structure 36. The catalyst 32 and gas permeable structure 36 can be constructed separately. The advantage of these embodiments is not only in ease of manufacture, but also in improving hydrogen gas generation rates. As hydrogen gas bubbles 33 travel through the $NaBH_4$ solution 42 to the gas permeable structure 36, they help agitate/stir the $NaBH_4$ solution 42. This action helps remove any attached reaction products from the surface of the catalyst 33 and make the solution 42 more uniform, thus improving subsequent hydrogen gas generation.

The simplicity of the solid piston 30b embodiment of the gas generator 10b of FIGS. 5A and 5B may reduce the cost sufficiently to provide disposability. Also, these embodiments may allow for reusable gas generators that can be refilled, if desired. For example, a cylindrically shaped gas generator not only reduces manufacturing costs, but also, the chemical supply chamber 41 can be fitted with a removable screw cap (not shown). When $NaBH_4$ solution is spent, the screw cap may be unscrewed, the spent $NaBH_4$ solution emptied, and the chemical supply chamber 41 refilled with fresh $NaBH_4$ solution. Alternatively, a positive displacement injection port (not shown) can be provided on the chemical supply chamber 41 to allow displacement of spent chemical supply with fresh chemical supply.

In addition, if the gas permeable structure 36 is made of a metal (such as palladium) or other suitable heat conductor, it can also function as a heat sink to draw away any waste heat produced by the hydrogen gas generating reaction. This keeps the gas generator 10b operating temperatures low. Another advantage of this embodiment is that the hydrogen gas storage chamber 40 can be located in the periphery of the gas generator 10b (i.e., surrounding the $NaBH_4$ chemical storage chamber 41). Since more of the hydrogen gas generator's total volume is available to store $NaBH_4$ solution 42, it increases the amount of hydrogen gas that can be generated per unit volume.

In operation of the embodiments of FIGS. 5A and 5B, as pressures within the $NaBH_4$ solution 42 build up due to excessive hydrogen gas 43 being generated and not utilized by the hydrogen gas consuming device 11 (FIG. 1), the catalyst coated piston 30b is compressed against the adjustable spring 65, and the piston 30b is forced out of the $NaBH_4$ solution 42. This acts to stop or limit hydrogen gas generating rates. These embodiments do not rely on the flexibility of the gas permeable structure 36. Depending on the adjustable tension in the spring 65 behind the piston 30b, pressures within the $NaBH_4$ solution 42 are sufficient to push the catalyst coated piston 30b out of the solution 42 to slow the reaction rate.

The embodiments of FIGS. 5A and 5B have the added advantage that the catalyst coated piston 30b can be easily sealed within a cylindrical body 78. This prevents accidental leakage of $NaBH_4$ solution 42 or hydrogen gas through the piston 30b. The tension of the spring 65 pushing against the piston 30b can either be adjusted at the time of manufacture or manually adjusted as needed for the particular application, desired gas pressures, or required gas flow rates. Various manual adjustment mechanisms known in the art may be employed to adjust the compression or tension of the spring 65.

Figure 6A:
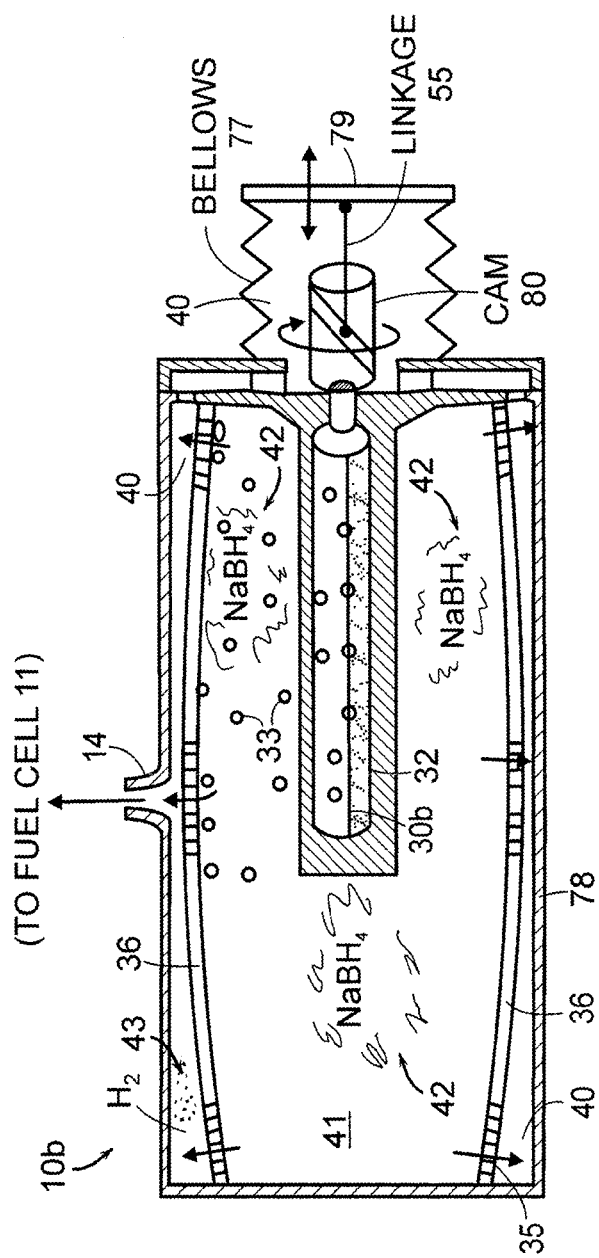
FIG. 6A is a schematic diagram of yet another embodiment of the gas generator of FIG. 1.

FIG. 6A is a mechanical schematic diagram of another embodiment of the gas generator 10. This embodiment is similar to the embodiment of FIGS. 5A and 5B, but, instead of having a piston 30b that exposes the catalyst 32 to the chemical supply 42 by moving the piston 30b in and out of the chemical supply 42, the element 30b, in this case a rotating rod 30b, rotates to alter the amount of catalyst exposed to the chemical supply 42. To create turning motion to rotate the rod 30b, the rod 30b is mechanically connected to a cam 80. The cam 80 is connected via a linkage 55 to a stiff wall 79 of a bellows 77. The bellows 77 is designed to react to pressure in the gas storage chamber 40, which extends along the outside of the elastic diaphragm 50c and into the bellows 77.

In operation, when the fuel cell 11 or other gas consuming device draws more generated gas 43 for production of electricity, for example, the pressure in the gas storage chamber 40 decreases, causing the bellows 77 to contract, which rotates the rotating rod 30b to expose more catalyst to the chemical supply 42. When the fuel cell 11 or other gas consuming device draws less generated gas 43, the pressure in the gas storage chamber 40 increases, causing the bellows 77 to expand and, in turn, causes the cam 80 to rotate the rod 30b to expose less catalyst 32 to the chemical supply 42. This causes the production of gas bubbles 33 and, in turn, pressure in the gas storage chamber 40 to slow and ultimately reach equilibrium commensurate with the amount of generated gas 43 being drawn.

It should be understood that ball bearings, gas bearings, or other techniques for allowing the rotating rod 30b and cam 80 to turn smoothly and with minimal resistance may be employed. Also, similar to the seal 22 in other embodiments, the rotating rod 30b embodiment of FIG. 6A may include an elongated seal (not shown) to prevent the chemical supply 42 from entering a chamber in which the rotating rod 30b resides. Anti-fouling brushes (not shown) may also be employed to prevent product and other materials from building-up on the rod 30*b* or catalyst 32.

Figure 6B:
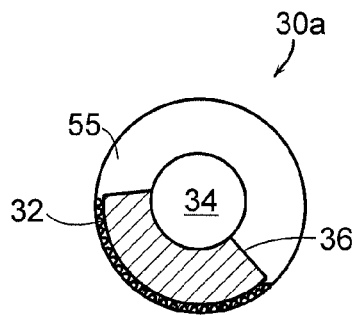
FIGS. 6B-6C are mechanical diagrams of an element (e.g., rotating rod) used in the gas generator of FIG. 6A.
Figure 6C:
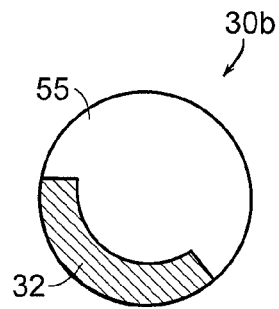

FIGS. 6B and 6C illustrate alternative rotating rod embodiments that may be employed in the gas generator of FIG. 6A. In FIG. 6B, the rotating rod 30*a* is shown by way of a cross-sectional axial view to be a hollow embodiment, similar to the piston 30*a* of FIG. 2A. In this embodiment, the catalyst 32 is disposed on a gas permeable membrane 36. The catalyst 32 is deposited in dimples that are formed in the gas permeable membrane 36, as described in reference to FIG. 3. As described in reference to FIG. 2A, the generated gas 43 initially forms in bubbles 33, enters the channel 34 of the hollow piston 30*a*, and travels to the gas storage chamber 40. It should be understood that the embodiment depicted in FIG. 6A is changed suitably to accommodate the hollow rod 30*a* embodiment. It should be noted that the hollow rod 30*a* includes a non-catalytic and non-porous material 55, which, when exposed to the chemical solution 42, neither reacts with the chemical solution 42 nor allows the chemical solution 42 or generated gas 43 to pass therethrough.

FIG. 6C is a cross-sectional axial view of a solid rod 30*b* used in the gas generator 10*b* of FIG. 6A. The solid rotating rod 30*b* supports the catalyst 32, which may be associated with the solid rod 30*b* to any depth, and the non-catalytic and non-porous material 55. Use of the solid rod 30*b* is described in reference to FIGS. 6D-6F below.

Figure 6D:
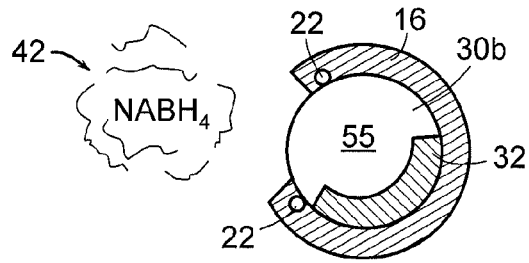
FIGS. 6D-6F are mechanical diagrams of the element of FIG. 6C in operation.

Referring first to FIG. 6D, the solid rotating rod 30*b* is positioned in a rounded partition 16 such that the catalyst 32 is not exposed to the chemical solution 42. The seals 22 prevent the chemical solution 42 from entering the region in which the solid rod 30*b* resides. In the position shown, the rotating solid rod 30*b* does not cause gas to be generated because the catalyst 32 is not in the presence of the chemical solution 42. The angle of the rotating rod 30*b* may be used for shipping the gas generator 10 or for stopping gas production in the case where there is no electrical load on a fuel cell, for example.

Figure 6E:
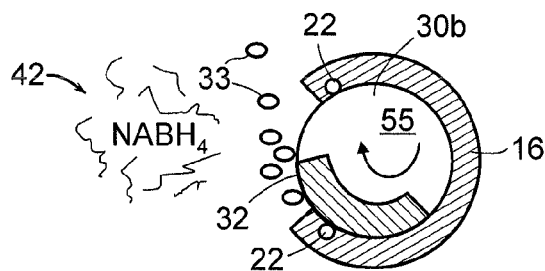

FIG. 6E illustrates the case where some gas is being produced. In this case, the rotating rod 30*b* is rotated such that some catalyst is exposed to the chemical supply 42. In turn, gas bubbles 33 are produced. The gas bubbles 33 contact the gas permeable membrane at various points along the gas permeable structure 36 (FIG. 6A), and the generated gas 43 passes through to the gas storage chamber 40.

Figure 6F:
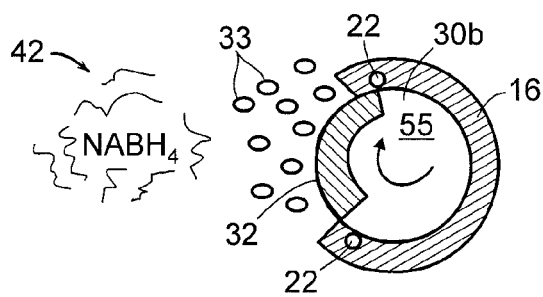

FIG. 6F illustrates a case at which maximum gas generation is required to satisfy the needs of the gas consuming device. In this case, the rotating solid rod 30*b* is positioned such that the catalyst 32 is exposed to the chemical supply 42 to its fullest extent allowed by the partition 16.

It should be understood that either rotating rod embodiment 30*a* or 30*b* may be a rotating sphere or other geometric shape that can support catalyst 32 to function in a similar manner as described above.

Figure 7:
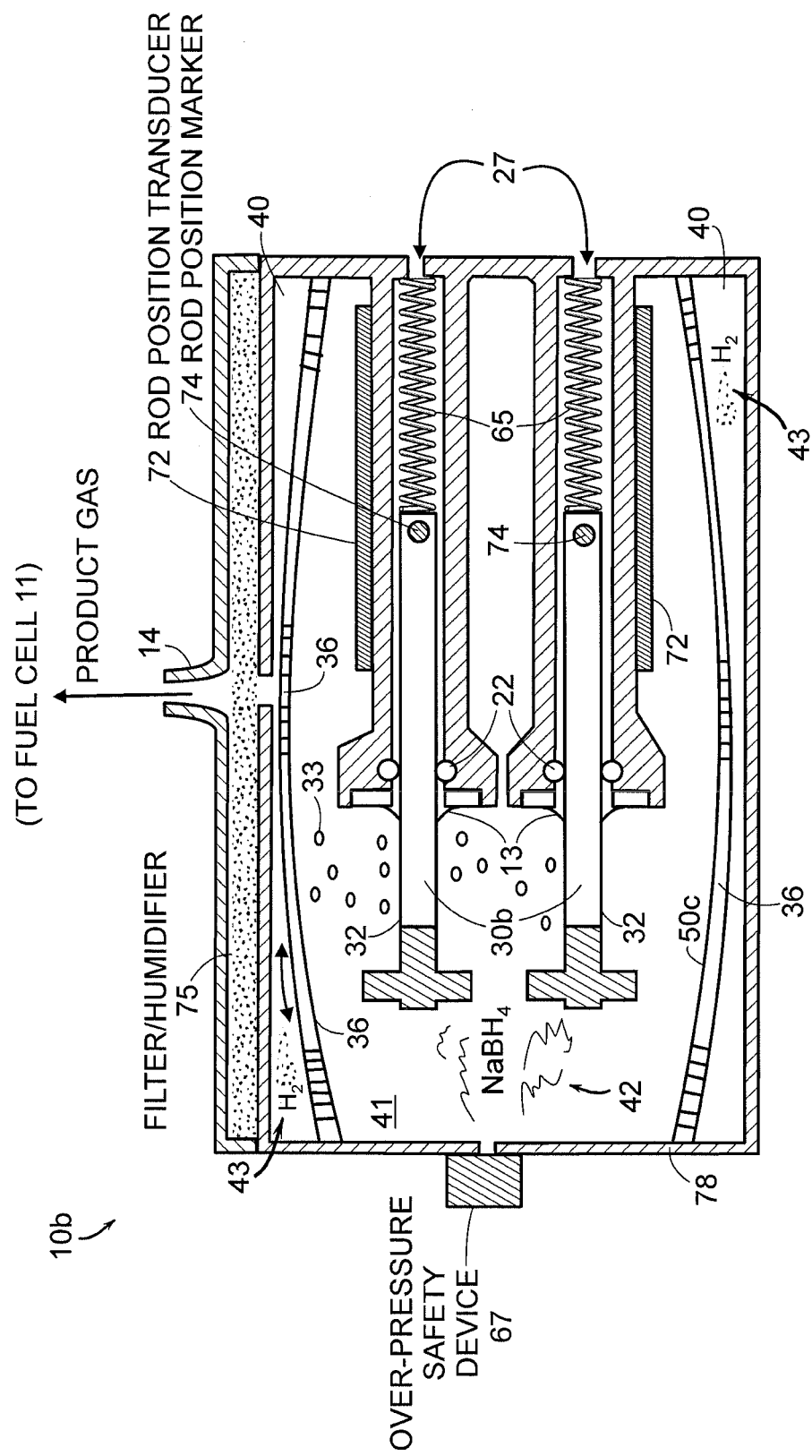
FIG. 7 is a mechanical schematic diagram of another embodiment of the gas generator of FIG. 1.

FIG. 7 is a mechanical schematic diagram of the gas generator 10*b* employing two solid pistons 30*b* that function in the same manner as the embodiment of FIG. 2B. In some embodiments, the pistons 30*b* move their respective associated catalyst 32 in a parallel manner into the presence of the chemical supply 42 to generate gas 43 in the chemical supply chamber 41. In alternative embodiments, only one of the pistons 30*b* is used until its catalyst 32 is spent, and then the other piston 30*b* is activated. In another embodiment, one piston 30*b* moves its associated catalyst 32 into the presence of the chemical supply 42 unless additional generated gas 43 is required for supplying the gas consuming device via the gas outlet 14. Other examples for operating the pistons 30*b* in unison or independent of one another are considered to be within the scope of the principles of the present invention.

The gas generator 10*b* of FIG. 7 also includes an over-pressure safety device 67. The safety device automatically exhausts some of the chemical supply 42 from the chemical supply chamber 41 in the event the chemical supply chamber 41 experiences too much pressure. The over-pressure safety device 67 may also be applied to a portion of the body 78 that surrounds the gas storage chamber 40 to relieve pressure from that chamber should an over-pressure situation occur.

The over-pressure safety device 67 may also be used as a portal to add more chemical supply 42, water, or other chemical used as a chemical supply for use in gas production. Similarly, the over-pressure safety device 67 may also be used to extract spent chemical supply 42 from the chemical supply chamber 41. The over-pressure safety device 67 may be connected to the body 78 of the gas generator 10 via mating threads, detent, clasps, or other mechanical fastening technique and may include a gasket or o-ring to prevent gas or chemical supply leakage. Alternatively, the over-pressure safety device 67 may be permanently connected to the body 78. In yet other embodiments, the over-pressure safety device 67 may be formed as an integral part of the body 78.

Another feature illustrated in the embodiment of the gas generator 10*b* in FIG. 7 is a filter/humidifier 75 that the generated gas 43 passes through from the gas storage chamber 40 to a gas utilizing device via the gas outlet 14. The filter/humidifier 75 may perform one or both functions. In the case of functioning as a filter, the filter/humidifier 75 may restrict substantially all but hydrogen gas from flowing therethrough. In the case of functioning as a humidifier, the filter/humidifier 75 adds water vapor or other gaseous vapor to the hydrogen gas as it traverses therethrough. The filter/humidifier 75 may be implemented in the form of a sponge-like material as known in the art.

The gas generator 10*b* of FIG. 7 also includes a rod position transducer 72 and a rod position marker 74 that are used to detect a position of the piston 30*b*. The transducer may be a Hall-effect transducer, capacitance probe, or other electro-magnetic transducer capable of sensing a compatible marker 74 located on the piston 30*b*. In other embodiments, the transducer 72 is an optical transducer that detects the positions of the piston 30*b*. In such an embodiment, an optical viewing port is provided to allow the transducer 72 to "see" the marker 74 or, in some cases, the piston 30*b* directly. It should be understood that a wheel with an optical encoder (not shown) or other position sensing device known in the art may be employed. In each of these cases, the use of a signal that represents the position of the piston may be used to provide information to an external device (not shown) or for use in generating electrical feedback for a motor (e.g., linear voice coil motor), pump, or other device(s) (not shown) that in some embodiments positions the piston 30*b* in the chemical supply 42 such that the catalyst 32 is exposed to the chemical supply 42 by an amount sufficient to generate enough gas 43 for supplying to the gas consuming device 11. A linear voice coil embodiment may have its windings built into an area of the body 78 of the gas generator 10*b* that has a composite or other material that allows for magnetic fields to couple to a magnetic element (not shown) on the piston 30*b* for controlling the position of the catalyst 32 in the chemical supply 42. Use of devices that can assist moving the piston 30*b* are understood in the art. Implementation of such a device, position transducer 72, position marker 74, and control electronics (not shown) may change the mechanical configuration depicted in FIG. 7.

The gas generator 10b may also include a capacity indicator (not shown) that informs a user or machine that the gas storage chamber is reaching or has reached substantially maximum capacity. The indicator may also indicate low capacity or a range of capacities. The capacity indicator may include a dial, electronic display, lights (e.g., LED's), audible signal, wireless messaging service, or other indicators known in the art. The capacity indicator may use a pressure transducer or other transducer known in the art. Other indicators, such as a 'fuel spent' or 'catalyst spent' indicator may also be employed.

Figure 8:
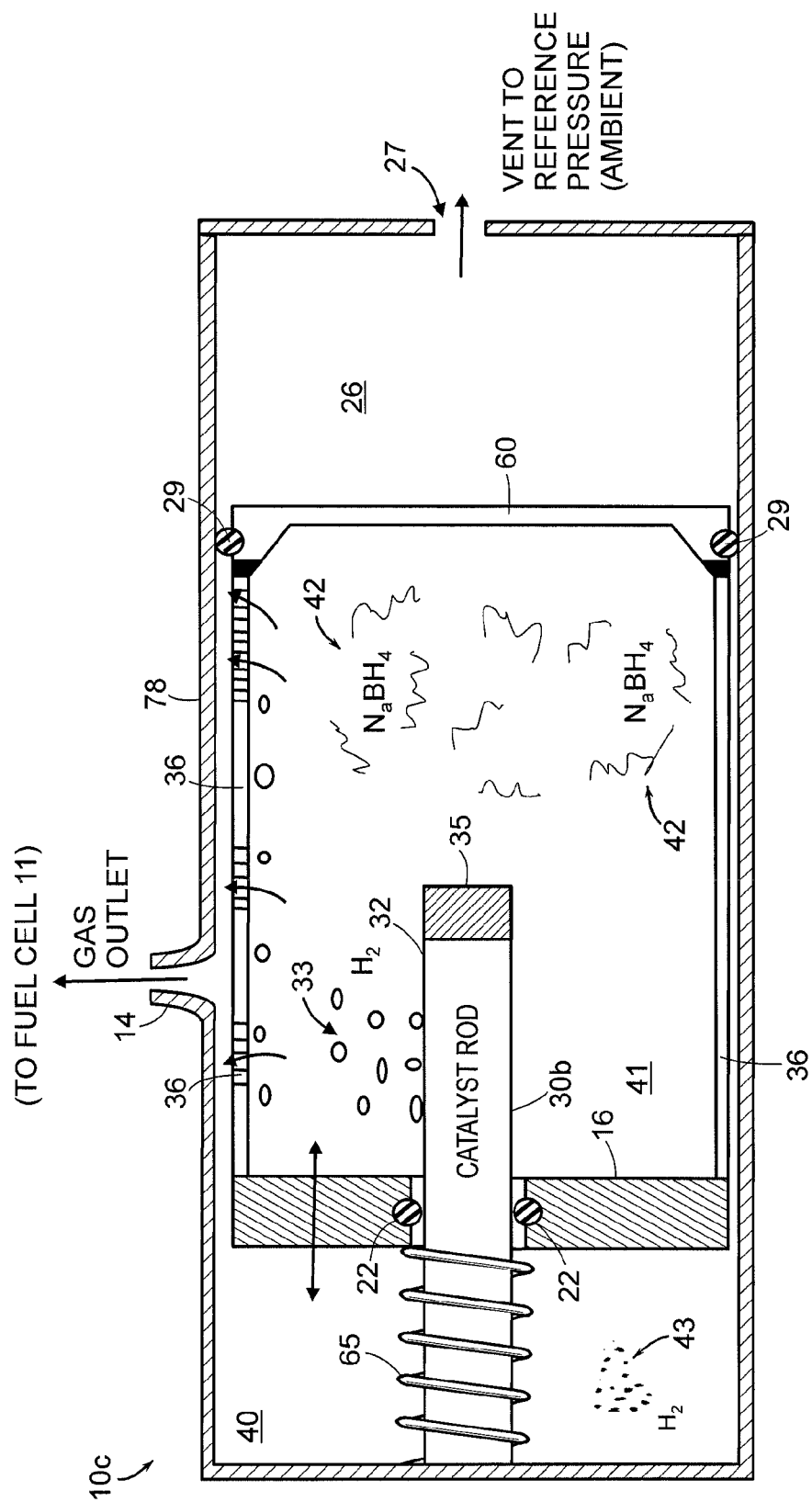
FIG. 8 is a mechanical schematic diagram of yet another embodiment of the gas generator of FIG. 1.

FIG. 8 illustrates another embodiment of the gas generator 10c. In this embodiment, instead of moving catalyst coated piston 30a or 30b into or out of the $NaBH_4$ solution 42 as described above, in FIG. 8, the entire $NaBH_4$ solution 42 is moved toward or away from the solid, catalyst coated piston 30b, which remains fixed in one embodiment. Since $NaBO_2$ is formed in the presence of a larger volume of $NaBH_4$ solution (where the $NaBO_2$ solubility remains high), the potential for catalyst fouling is minimized. The catalyst life is thus markedly extended. It should be understood that in other embodiments, the piston 30a or 30b may also move in a manner as described above; thus, a differential motion between the $NaBH_4$ solution 42 and catalyst coated piston 30b may be provided.

The gas permeable structure 36 can be on portions of the elastic diaphragm 50c or be the entire elastic diaphragm 50d as in FIG. 5B. The embodiment of FIG. 8 may be constructed in a cylindrical body 78 and with removable screw caps (not shown) on the ends. In this design, not only can the $NaBH_4$ solution 42 be replaced when it has been spent, but the catalyst 32 may also be changed easily by replacing the piston 30b. This allows a given catalyst 32 to be replaced with a more active or less active catalyst (depending on the particular application). It should be understood that hollow pistons 30a may also be used in this embodiment and replaced in this and other embodiments.

Figure 9A:
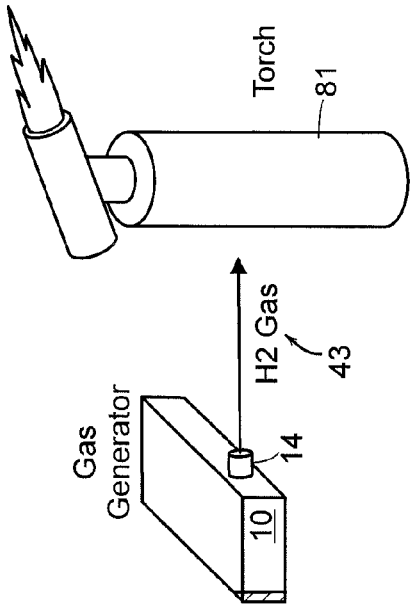
FIGS. 9A and 9B are diagrams of example other applications in which a gas generator according to the principles of the present invention may be employed.
Figure 9B:
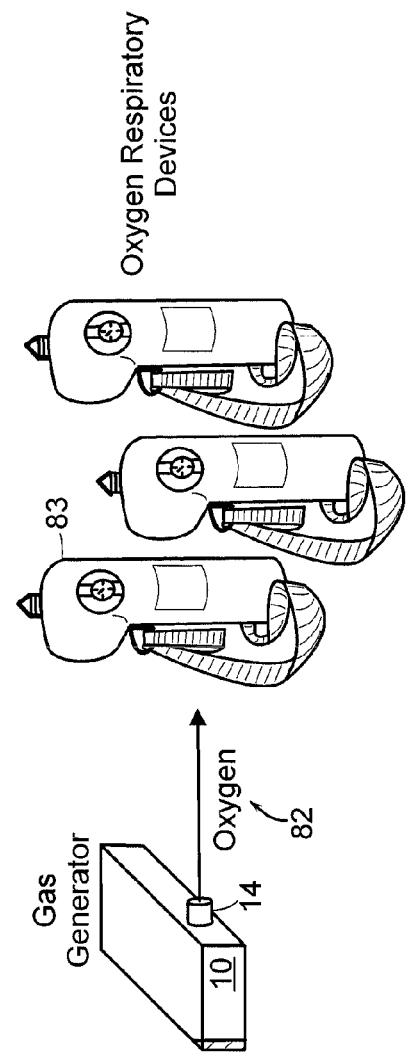

FIGS. 9A and 9B illustrate examples of applications for which a gas generator according to the principles of the present invention may be employed other than for fuel cell applications.

In FIG. 9A, the gas generator 10 generates hydrogen gas 43 and provides the gas via its gas output port(s) 14 to a jeweler's torch 81 or other combustion device. It should be understood that the gas generator 10 may produce other gases through decomposition of chemical supplies in the presence of catalysts (not described herein but known in the art) for combustion by the torch 81 or other combustion devices.

In FIG. 9B, the gas generator 10 generates oxygen gas 82 and provides the gas via its gas output port(s) 14 to an oxygen respiratory device 83. The gas generator 10 may also be used with other respiratory devices, such as a diver's tank, in which case a single or multiple gas generators 10 may be used to provide a combination of nitrogen and oxygen to the tank for use by divers in underwater dives.

The gas generators of FIGS. 9A and 9B are located external from the gas consuming devices 81 and 83, respectively, for illustration purposes only. It should be understood that in practice, the gas consuming devices 81, 83 may provide compartments into which the gas generator(s) 10 are inserted. The gas consuming devices 81 may include generic or custom latching mechanisms (not shown) that hold the gas generator(s) in place.

While this invention has been particularly shown and described with references to preferred embodiments thereof, it will be understood by those skilled in the art that various changes in form and details may be made therein without departing from the scope of the invention encompassed by the appended claims.

For example, it is well known that aqueous $NaBH_4$ solutions have a tendency to slowly self-decompose and form hydrogen gas as per Equation 1, even in the absence of any catalyst. A possible solution for long-term storage is to pack $NaBH_4$ powder while dry and separate it from the water and/or NaOH, then mix the two ingredients when the need to generate hydrogen gas arises. These two components may be packaged in a breakable glass or membrane-separated design such that when the glass or membrane is broken within the catalytic reactor before use, the $NaBH_4$ chemical supply 42 and water can mix.

As an additional safety or control feature for the embodiments of gas generators described herein, an electrical potential can be applied between the catalyst 32 and the chemical solution 42 to control gas evolution enabled by the catalyst 32.

The disclosed gas generator embodiments allow for inclusion of additional features that may enhance the storage, handling, and treatment of the product gases. Examples other than those already described include a heating element, where the increased temperature accelerates production of gas, or a piezoelectric device, which generates gas from a particular solution or mixture through vibration.

To make the gas generators described herein user-friendly and self-identifying, the gas outlet(s) 14 may have a standard or custom shape for interfacing with various devices on a standard or application-by-application basis. For example, the gas outlets may be shaped in the form of an 'O' or 'H' to indicate that oxygen or hydrogen gas, respectively, is generated by the gas generator 10. Such designs can be useful for preventing user error where multiple gas generators are being used in a given application.

FIGS. 10A-10C are mechanical schematic diagrams of another embodiment of the fuel cartridge 10d in which bang-bang control is used to generate gas 43. In this embodiment, the fuel cartridge 10d has a size profile defined by a body 78 in which there is a cavity or cavities for each of a gas storage chamber 40, chemical supply chamber 41, and reference pressure chamber 26. The gas storage chamber 40 is separated from the chemical supply chamber 41 by a gas permeable, liquid impermeable membrane 36, which may be coupled to the body 78 of the fuel cartridge 10d by peripheral seals 29.

In the embodiment of FIGS. 10A-10C, the reference pressure chamber 26 is separated from the chemical supply chamber 41 by a pressure seal, such as a bellows seal 77 or equivalent, optionally in combination with an element 30c. In one example embodiment, the illustrated bellows seal 77 may form a complete pressure seal (e.g., the shape of a hat with flexible sides) between a vent 27 to reference pressure and the chemical supply chamber 41. In an alternative embodiment, the bellows seal 77 forms a pressure seal in combination with the element 30c (i.e., the bellows seal 77 is in the shape of a hat with flexible sides and no top) to maintain pressure separation (and liquid and gas impermeability) between the reference pressure chamber 26 and chemical supply chamber 41.

It should be understood that an insert (not shown) may be press-fit into the body 78 and include some or all of the features of the chambers 40, 41, 26, where the insert may enable a user to replace catalyst without replacing the body of the gas generating device.

Alternatively, the insert may be coupled to the element such that the body and element can be maintained across catalyst replacement(s). Any number of coupling mechanisms known in the art may be employed to enable the insert to be coupled to and uncoupled from the body or element, such as press-fit, latches, spring clips, interlocking features, and so forth. In this way, replacement inserts with catalyst and, in some embodiments, chemical supply can be provided to end users so that small or inexpensive component(s) (i.e., the insert and any coupling mechanisms) of the gas generating device can be replaced rather than the entire gas generating device.

The definition of orientation-independence or "in an orientation-independent manner" as used herein means that the gas generating device 10d can operate correctly regardless of its physical orientation. This means that the generation of gas 43 in the chemical supply chamber 41, and exiting of the gas 43 from the chemical supply chamber 41, to the gas storage chamber 40, can occur regardless of the physical orientation of the gas generating device 10d. Under normal conditions, the chemical supply 42 remains in the chemical supply chamber 41 regardless of the physical orientation of the gas generating device 10d.

In the embodiment of FIGS. 10A-10C, as part of the orientation-independence, the generated gas 43 passes through the gas permeable, liquid impermeable membrane 36 on a path from a proximal end (left end adjacent to the gas storage chamber 40 in FIGS. 10A and 10B) of the chemical supply chamber 41 to the gas storage chamber 40 or on a path via a gas passage 28 that spans from a distal end (right end adjacent to the reference pressure chamber 26) of the chemical supply chamber 41 to the gas storage chamber 40. The gas passage 28 enables generated gas 43 to flow from the chemical supply chamber 41 to the gas storage chamber 40 even if the reference pressure chamber 26 is physically above the gas storage chamber 40 during operation, provided there is a sufficient level of gas pressure differential between the chemical supply chamber 41 and gas storage chamber 40.

The chemical supply chamber 41, in the embodiment of FIGS. 10A-10C, includes complementary features 37a, 37b. The complementary features 37a, 37b may be in the form of opposing slopes in a modified saw-tooth pattern defined by a portion of an interior wall of the body 78 and a portion of an exterior wall of the element 30c. The chemical supply chamber 41 may also include a pressure relief valve (not shown) that opens if pressure inside the chemical supply chamber 41 reaches an unsafe level (i.e., exceeds a "safe pressure" threshold).

Continuing to refer to FIGS. 10A-10C, the element 30c has slots or holes 31 through which the chemical supply 42 and, in turn, generated gas 43, in the chemical supply chamber 41 flow during operations of the fuel cartridge 10d. In the example embodiment of FIGS. 10A-10C, the chemical supply 42 flows into and out of voids 45a, 45b defined by the geometry of the complementary features 37a, 37b. While the chemical supply 42 is within the void 45a between the complementary features 37a, 37b during the ON state, a catalyst 32 on one of the complementary features 37a (or 37b) is exposed to the chemical supply 42, which causes a reaction between the chemical supply 42 and catalyst 32, thereby generating the gas 43 that flows through the gas permeable membrane 36 into the gas storage chamber 40 (regardless of orientation of the fuel cartridge 10d). On the other one of the complementary features 37b (or 37a) is a "displacer" 13, which serves as a displacing seal that removes chemical supply 42 from the catalyst 32 as the complementary features 37a, 37b come into contact with each other, which, in the embodiment of FIGS. 10A-10C, occurs by the element's 30c translating from left to right (i.e., toward the reference pressure chamber 26). The other void 45b and the rest of the chemical supply chamber 41 accept the chemical supply 42 displaced from the void 45a between the complementary features 37a, 37b. Because of the displacer 13, the fuel cartridge 10d does not generate the gas 43 while the complementary features 37a, 37b remain in contact with each other following removal of the chemical supply 42 from the catalyst 32. The chemical supply 42 flows away from the catalyst 32 through the slots or holes 31 as the chemical supply 42 is displaced from the catalyst 32, where the chemical supply 42 flows as a function of movement of the element 30c, as described in more detail below.

In the embodiment of FIGS. 10A-10C, the reference pressure chamber 26 is bounded by the bellows seal 77, the end of the element 30c (in some embodiments), and the body 78. The reference pressure chamber 26 also contains a spring 65, where the spring 65 serves as a forcer to cause the element 30c to translate (or rotate) relative to the body 78 of the fuel cartridge 10d. The bellows seal 77 (i) serves to isolate the chemical supply 42 from the spring 65, (ii) serves to isolate the chemical supply 42 from the reference pressure chamber 26 that leads to a vent 27 to a reference pressure environment, such as ambient pressure environment surrounding the fuel cartridge 10d, and (iii) serves to maintain a separation of pressure between the two chambers 41 and 26.

FIG. 10C is a mechanical schematic diagram of a close-up view of an embodiment of the complementary features 37a, 37b in which a detent 90, represented in FIG. 10C as a pair of frictional or spring loaded frictional features 92a, 92b, as an example, that apply a given amount of resistive force to the complementary features 37a, 37b unless a sum of forces exerted on the element 30c overcomes the given amount of resistive force. It should be understood that the given amount of resistive force can be set by contact angles of the frictional features 92a, 92b, spring force of a member 94 that couples one of the frictional features 92b to the element 30c, and surface effects of the material(s) at the interface of the frictional features 92a, 92b. In other embodiments, other forms of detents known in the art may be used, such as a spring-loaded rounded surface and indentation pair. It should also be understood that the given amount of resistive force may not be the same for both directions of travel of the element 30c. The resistive force(s) may be set to provide a predetermined amount of hysteresis between transitions from the ON to OFF and OFF to ON states.

During operation, the bang-bang fuel cartridge 10d embodiment generates the gas 43 with a self-adjusting duty cycle depending on the amount of gas 43 that is "requested" by an external device (not shown) gaseously coupled to a gas outlet 14. The term "self-adjusting duty cycle" as used herein is defined as the gas generating device's ability to adjust its length of ON state compared to its total length of ON plus OFF states in generating gas as a function of fuel (i.e., chemical supply) concentration and catalyst effectiveness for a given gas demand. The self-adjusting may be done passively or actively.

The self-adjusting duty cycle (illustrated in FIGS. 11A-11C) occurs as a result of the element's 30c translating (or rotating or otherwise moving) as a function of pressure internal to the chemical supply chamber 41 relative to pressure external from the chemical supply chamber or, more generally, a sum of forces acting upon the element 30c. After operations have begun and some gas 43 has been generated, as pressure in the gas storage chamber 40, and, consequently, the chemical supply chamber 41, builds up as a result of lower or no gas flow through the gas outlet 14, the pressure in the chemical supply chamber 41 exerts a force against the element 30c and, in turn, against the spring 65. As a result, the element 30c translates from its ON state position in FIG. 10B to its OFF state position in FIGS. 10A and 10C until the complementary features 37a, 37b, which were apart from each other during the generation of gas 43, are in contact with each other, which discontinues the generation of the gas 43. Likewise, when the flow of the generated gas 43 through the gas outlet 14 restarts or increases, the pressure in the gas storage chamber 40 decreases, leading to a decrease in pressure in the chemical supply chamber 41, thereby enabling the spring 65 to exert its force on the element 30c, which, in turn, exposes the catalyst 32 to the chemical supply 42 as the complementary features 37a, 37b are moved apart from each other as a function of pressure differential between pressure in the chemical supply chamber 41 relative to pressure in the reference pressure chamber 26.

The movement of the element 30c turns on and off a reaction between the catalyst 32 and chemical supply 42, where control of the ON state and OFF state is referred to herein as bang-bang control. The bang-bang control enables and disables generation of the gas 43 according to a duty cycle defined by the ON state relative to the OFF state within a given period of time, described in more detail below in reference to FIGS. 11A-11C. The position of the translating or rotating element 30c and complementary features 37a, 37b in the OFF state 39a is shown in FIGS. 10A and 10C, and the position of the element 30c and complementary features 37a, 37b is shown in the ON state 39b in FIG. 10B.

It should be understood that the change in states may be a "snap" action that occurs when the pressure differential exceeds or falls below certain threshold(s), and there may be hysteresis designed into the change in states, such as through use of a detent or other mechanical means known in the art, so that continual snapping does not occur while the pressure differential remains near the threshold(s).

FIG. 10B illustrates the ON state 39b in which the gas 43 has a flow rate through the gas outlet 14 to an external device (not shown), such as fuel cells in the case of hydrogen gas, for example. In such a case, the fuel cells may demand the gas 43 as a function of power demanded from the fuel cells by an electricity-consuming device (not shown) electrically connected to the fuel cells. Examples of electricity-consuming devices may be individual devices, such as a radio, mobile communications device, motor used to rotate a propeller, or entire electric vehicle; another example may be a power grid that feeds a home, neighborhood, town, or city. In other words, the fuel cartridge 10d may generate gas according to a self-adjusting duty cycle as a function of usage of electricity by an electrical device.

The bang-bang fuel cartridge 10d embodiment may change from the OFF state 39a of FIGS. 10A and 10C to the ON state 39b of FIG. 10B and back again many times per minute, per several minutes, or per hour as a function of demand of the gas by fuel cells being used to power an electrical device. The total surface area of catalyst exposed in the ON state might be, by design, larger than the surface area needed to sustain the maximum gas flow rate. Therefore, when the fuel cartridge is ON in response to low pressure in the gas chamber storage chamber 40, the chemical supply chamber pressure can rapidly rise to the extent that its force on the element 30c overwhelms the spring opposing force (and force of the detent 90) and slams the element to the OFF position. The element remains in the OFF position until sufficient gas 43 is consumed, reducing the pressure in the gas storage chamber 40 and chemical supply chamber 41 to the value that slams the element back to the ON position. The self-adjusting duty cycle, thus, controls a gas pressure in the gas storage chamber 40 to support a steady flow of the gas 43 through the gas outlet 14 to the fuel cells or other external device(s).

The fuel cartridge can be constructed to operate passively, relying on only internally-generated pressures to switch between ON and OFF states via bang-bang control. The element 30c can alternatively be constructed to operate actively, such as through use of a solenoid-type or linear motor mechanism, to be translated in bang-bang fashion, where the mechanism is activated or controlled by external process(es) that operate as a function of input pressures sensed within the fuel cartridge. A fuel cell array that generates power using the hydrogen generated by the fuel cartridge 10d may provide power to a microcontroller, microprocessor, or other circuitry used to run the process(es) that control the solenoid-type or linear motor mechanism.

Figure 11A:
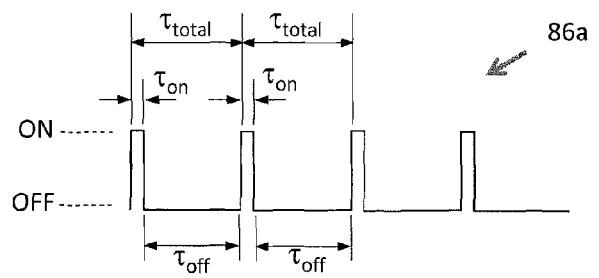
FIGS. 11A-11C are a set of timing diagrams that illustrate duty cycles at different points in time during operation of the embodiment of the gas generator of FIGS. 10A-10C.
Figure 11B:
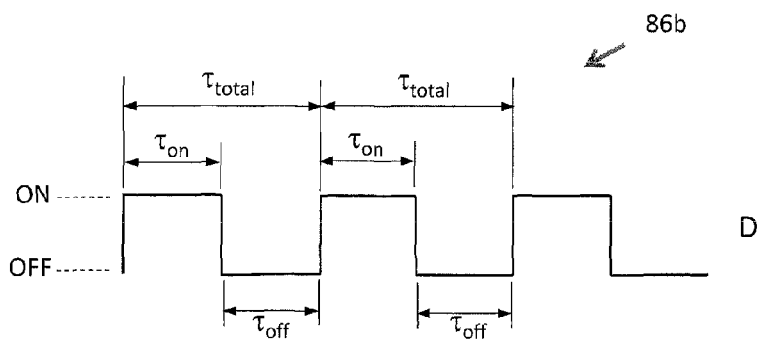
Figure 11C:
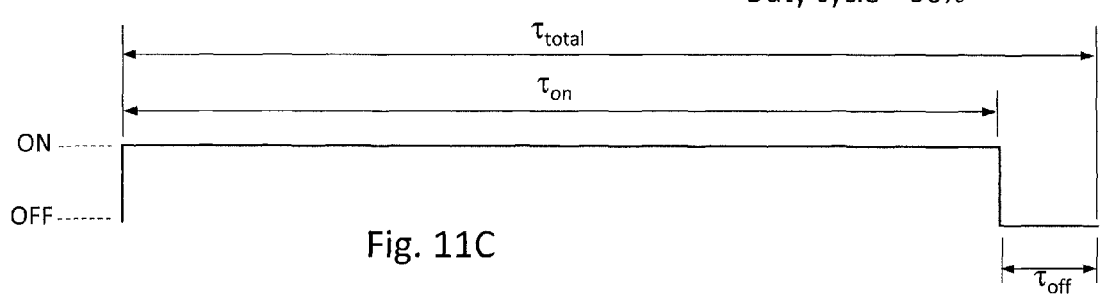

FIGS. 11A-11C provide a sequence of timing diagrams 86a-86c that illustrate the self-adjusting duty cycle associated with the operations of the example embodiment of the gas generating device 10d of FIGS. 10A-10C. The timing diagrams 86a-86c include representations of ON states and OFF states, where the ON state is indicated as a horizontal line 87a above a horizontal line 87b that indicates an OFF state.

In terms of operational parameters in reference to the bang-bang fuel cartridge 10d embodiment of FIGS. 10A-10C, the timing diagram 86a of FIG. 11A illustrates a case in which the catalyst 32 is at high strength (e.g., unfouled) and the concentration of chemical supply 42 is at high concentration. The timing diagram 86a illustrates a duty cycle of, for example, 10%, where the ON state $T_{on}$ has a 10% portion of a given operating period, $T_{Total}$, and the OFF state, $T_{off}$, has 90% portion of the given operating period. In the example embodiment, a 10% duty cycle may be all that is needed for the gas 43 that flows to the gas storage chamber 40 of FIGS. 10A and 10B to provide sufficient pressure within the gas storage chamber 40 such that the fuel cartridge 10d can maintain a constant flow of the gas 43 to an external device (not shown), such as fuel cells, via the gas outlet 14. In the case in which a flow of the gas via the gas outlet 14 stops, it should be understood that the production of the gas 43 drops to a point at which the duty cycle is 0% (not shown), meaning that the OFF state is present the entire time of the given operating period. It should be understood that leakage of the gas 43 from the gas storage chamber 40 may cause the duty cycle to be greater than 0% by a certain amount (e.g., 1%, 3%, 5%, or fractional amounts greater than 0%).

Over time due to catalysis, the concentration of the chemical supply 42 diminishes (e.g., sodium borohydride is catalyzed into sodium borate) or the catalyst's effectiveness degrades. As a consequence, the duty cycle increases to an amount of, for example, 50%, as illustrated in the timing diagram 86b of FIG. 11B. Through operations, the chemical supply 42 continues to deplete in concentration due to catalysis, causing the duty cycle to increase, such that the ON state is even greater in duration than the OFF state, such as for a duty cycle of 90%, as illustrated in the timing diagram 86c of FIG. 11C.

Notably, the duration of the OFF state, $T_{off}$, is approximately the same in each of the three duty cycle timing diagrams 86a-86c because the OFF state represents a length of time during which a constant flow of the gas 43 is delivered to an external device from the gas storage chamber 40 via the gas outlet port 14 of FIGS. 10A and 10B. If the flow of the gas 43 to the external device increases or decreases appreciably, the length of the OFF state represented in the timing diagrams 86a-86c decreases or increases, respectively, by certain amounts to accommodate a level of pressure in the gas storage chamber 40 suitable for maintaining the increased or decreased gas flow rate.

The three timing diagrams 86a-86c can be used to represent various different scenarios or combinations thereof. One scenario, consistent with the above example, illustrates a condition in which the catalyst 32 is unfouled and strongly catalyzes and in which the chemical supply 42 changes from a state of high concentration to a state of lower concentration over time. In this first scenario, the timing diagram 86a of FIG. 11A illustrates a duty cycle in which the chemical supply 42 has a state of high concentration, the timing diagram 86b of FIG. 11B illustrates a duty cycle in which the chemical supply 42 has a state of intermediate concentration, and the timing diagram 86c of FIG. 11C illustrates a duty cycle in which the chemical supply 42 has a state of reduced concentration. The duty cycle of 10% in the timing diagram 86a of FIG. 11A illustrates a situation in which only short bursts of ON state are required to generate sufficient gas 43 to maintain a substantially constant gas pressure (e.g., 5 psi+/−10%, 20%, or other percentage) in the gas storage chamber 40 while the gas 43 flows via the gas outlet 14; later in time (FIG. 11B or 11C), the duration of ON state required to maintain that same substantially constant pressure must be longer (e.g., 50% or 90%). It should be understood that the examples of 10%, 50%, and 90% duty cycles are representative examples of duty cycles and that duty cycles can range from 0% to 100% in analog increments. It should also be understood that the pressure in the gas storage chamber 40 can be selected based on a particular application and design parameters.

In a second scenario, the timing diagrams 86a-86c illustrate a condition in which the catalyst 32 becomes fouled or is otherwise spent over time, which may occur if the same catalyst 32 is used across multiple re-fillings of the gas generating device 10d with fresh (i.e., high concentration) chemical supply 42. In such a scenario, early in the life of the catalyst 32 in the presence of a chemical supply 42 having a state of high concentration, the duty cycle may be short (e.g., 10% of FIG. 11A) to produce, for example, 5 psi of gas pressure in the gas storage chamber 40; but, later in its life, to produce the same amount of gas pressure in a presence of a chemical supply 42 having the same state of high concentration, the catalyst 32 may require the duty cycle to start at about 50%, as illustrated in the middle timing diagram 86b of FIG. 11B. Still later in the life of the catalyst 32, in a presence of a chemical supply 42 having the same state of high concentration, the catalyst 32 may require the duty cycle to start at upwards of 90%, as illustrated in the timing diagram 86C of FIG. 11C, to produce the same 5 psi of gas pressure in the gas storage chamber 40.

It should be understood that at a certain point, the catalyst 32 will become sufficiently fouled or spent such that it cannot catalyze enough chemical supply 42 to generate a sufficient amount of gas 43 to support enough gas pressure in the gas storage chamber 40 to maintain a flow rate via the gas outlet 14 that supports a demand for the gas 43 by an external device. In this "terminal phase" condition, the duty cycle will be at 100%, and the length of the timing diagram's 86a-c horizontal line 87a representing the ON state will decrease, possibly with a step function if a detent 90 (FIG. 10C) is used, eventually approaching or becoming equal to the length of the horizontal line 87b representing the OFF state, at which time there is little or no further gas generation. In such a circumstance, the user will have to recharge the catalyst 32, replace the catalyst 32, or simply obtain a new fuel cartridge 10d so that normal operations can begin again.

While this invention has been particularly shown and described with references to example embodiments thereof, it will be understood by those skilled in the art that various changes in form and details may be made therein without departing from the scope of the invention encompassed by the appended claims.

What is claimed is:

1. A gas generating device, comprising:
    a body;
    a chemical supply chamber within the body defining a volume configured to contain a chemical supply, the chamber including an element configured to expose a catalyst contained within the chamber to the chemical supply according to a self-adjusting duty cycle, wherein the element and the body define complementary features having respectively the catalyst or a displacer, and wherein the complementary features are configured to expose the catalyst to the chemical supply and remove the chemical supply from the catalyst; and
    a frictional feature located on the element, wherein the frictional feature is one of a pair of frictional features forming a detent, the other frictional feature of the pair located within the chemical supply chamber.

2. The gas generating device of claim 1 wherein the element defines a portion of a boundary of the chamber.

3. The gas generating device of claim 1 wherein the element is configured to move between an ON position and OFF position in response to a sum of forces acting on the element, the forces including force applied by pressure internal to the chamber, pressure internal to a reference pressure chamber, and a forcer.

4. The gas generating device of claim 3 wherein:
    when pressure internal to the chemical supply chamber is above a first threshold, the element is positioned relative to the body with the complementary features in contact with one another, with the displacer displacing chemical supply from the catalyst as the complementary features come into contact with one another; and
    when the pressure internal to the chemical supply chamber is below a second threshold, the element is positioned relative to the body with the complementary features apart from one another,
    wherein the first and second thresholds are the same or different from each other.

5. The gas generating device of claim 1 wherein the element and the body define multiple pairs of complementary features having respectively the catalyst or a displacer, and wherein the multiple pairs of complementary features are configured to expose the catalyst to the chemical supply and remove the chemical supply from the catalyst in parallel with each other.

6. The gas generating device of claim 1 wherein the element and catalyst are coupled to each other.

7. The gas generating device of claim 1 wherein the catalyst is coupled to the body in a chamber-facing direction, and wherein the element is configured to move relative to the body in a translational or rotational motion.

8. The gas generating device of claim 1 wherein the element is configured to translate or rotate relative to the catalyst.

9. The gas generating device of claim 1 wherein a body defines a profile of the gas generating device and wherein the body or the element is configured to have an insert with catalyst removably coupled to the body or element, respectively.

10. The gas generating device of claim 1 wherein the gas generating device defines three chambers therein, including a gas storage chamber, the chemical supply chamber, and a reference pressure chamber;
wherein the gas generating device further comprises a gas permeable, liquid impermeable membrane separating the gas storage chamber from the chemical supply chamber;
wherein a seal or seal in combination with the element separates the chemical supply chamber from the reference pressure chamber; and
wherein gas generated flows from the chemical supply chamber to the gas storage chamber in the orientation-independent manner.

11. The gas generating device of claim 10 further comprising a forcer located in the reference pressure chamber, the forcer being coupled to the element to exert a force on the element and wherein the element moves as a function of a sum of forces exerted upon it.

12. The gas generating device of claim 1 wherein, during a transition from an ON state to an OFF state that define states of the self-adjusting duty cycle, the chemical supply is displaced from the catalyst.

13. The gas generating device of claim 1 wherein duration of an OFF state of the self-adjusting duty cycle is constant for a given gas demand.

14. The gas generating device of claim 1 wherein the frictional feature is integral with the element.

15. The gas generating device of claim 1 wherein the other frictional feature of the pair is integral with the body.

16. The device of claim 1 wherein the frictional feature applies a resistive force providing hysteresis for transitions between ON and OFF states within an operating period of the duty cycle.

17. The device of claim 1 wherein the element is configured to expose the catalyst to the chemical as a function of pressure internal to the chamber relative to pressure external from the chamber to generate and output a gas in an orientation-independent manner.

18. A method for generating a gas, comprising:
containing a chemical supply in a chemical supply chamber, the chamber disposed within a body of a gas generating device and including an element configured to expose a catalyst contained within the chamber;
with the element, exposing the catalyst contained within the chamber to the chemical supply according to a self-adjusting duty cycle, wherein the element and the body define complementary features having respectively the catalyst or a displacer configured to displace the chemical supply from the catalyst, thereby generating and outputting a gas in an orientation-independent manner; and
applying a resistive force with a frictional feature located on the element, the resistive force providing hysteresis at transitions between ON and OFF states within an operating period of the self-adjusting duty cycle.

19. The method of claim 18 wherein exposing the catalyst to the chemical supply includes moving or changing orientation of a portion of a boundary of the chamber defined by the element.

20. The method of claim 18 further comprising moving the element between an ON position or orientation and OFF position or orientation in response to a sum of forces acting on the element, the forces including force applied by pressure internal to the chamber, pressure internal to a reference pressure chamber, and a forcer.

21. The method of claim 18 wherein:
when pressure internal to the chemical supply chamber is above a first threshold, the method further comprises positioning or orienting the element relative to the body with the complementary features in contact with one another, with the displacer displacing chemical supply from the catalyst as the complementary features come into contact with one another; and
when the pressure internal to the chemical supply chamber is below a second threshold, the method further comprises positioning or orienting the element relative to the body with the complementary features apart from one another,
wherein the first and second thresholds are the same or different from each other.

22. The method of claim 18 wherein the element and the body define multiple pairs of complementary features having respectively the catalyst or a displacer, with the multiple pairs of complementary features arranged to operate in parallel with each other, and wherein the method further comprises exposing the catalyst to the chemical supply and removing the chemical supply from the catalyst by moving a set of like members of the multiple complementary features in parallel with each other to transition between states defining the self-adjusting duty cycle.

23. The method of claim 18 wherein exposing the catalyst to the chemical supply includes exposing the catalyst to the chemical supply with hysteresis at a state change of the self-adjusting duty cycle.

24. The method of claim 18 wherein exposing the catalyst includes moving the catalyst with the element during transitions between states defining the self-adjusting duty cycle.

25. The method of claim 18 wherein exposing the catalyst includes translating or rotating the element relative to the catalyst during transitions between states defining the self-adjusting duty cycle.

26. The method of claim 18 wherein an insert includes catalyst and wherein the method further comprises enabling a user to exchange the insert associated with a body defining a gas generating device or element therein with a different insert.

27. The method of claim 18 wherein the chemical supply chamber is operatively coupled to a gas storage chamber and a reference pressure chamber, and wherein the method further comprises:
enabling the gas, but not the chemical supply, to pass from the chemical supply chamber to the gas storage chamber via a gas permeable, liquid impermeable membrane and in the orientation-independent manner;
enabling the element to change position or orientation at a boundary of the chemical supply chamber and the reference pressure chamber.

28. The method of claim 27 wherein enabling the element to change position or orientation includes exerting a force on the element through use of a forcer positioned in the reference pressure chamber.

29. The method of claim 18 further comprising removing chemical supply from the catalyst during a transition from an ON state to an OFF state that define states of the self-adjusting duty cycle.

30. The method of claim 18 wherein the duration of an OFF state of the self-adjusting duty cycle is constant for a given gas demand.

31. The method of claim 18 wherein the frictional feature is integral with the element.

32. The method of claim 18 wherein exposing the catalyst to the chemical supply occurs as a function of pressure internal to the chamber relative to pressure external from the chamber.

33. An apparatus for generating a gas, comprising:
a body;
means for containing a chemical supply in a chemical supply chamber within the body; and
means for exposing, with an element contained within the chemical supply chamber, a catalyst contained within the chamber to the chemical supply according to a self-adjusting duty cycle as a function of pressure internal to the chamber relative to pressure external from the chamber to generate and output a gas in an orientation-independent manner, the element and the body defining complementary features having respectively the catalyst or a displacer configured to displace the chemical supply from the catalyst; and
means for applying a resistive force with a frictional feature located on the means for exposing the catalyst, the resistive force providing hysteresis at transitions between ON and OFF states within an operating period of the self-adjusting duty cycle.

\* \* \* \* \*